(12) United States Patent
Cariou et al.

(10) Patent No.: US 10,554,268 B2
(45) Date of Patent: **\*Feb. 4, 2020**

(54) METHOD, WIRELESS DEVICE, AND COMPUTER READABLE MEDIUM FOR CONDUCTING A MULTIPLE STATION BEAM REFINEMENT PROTOCOL IN A WIRELESS NETWORK

(71) Applicant: INTEL IP CORPORATION, Santa Clara, CA (US)

(72) Inventors: Laurent Cariou, Portland, OR (US); Chittabrata Ghosh, Fremont, CA (US); Carlos Cordeiro, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/268,760

(22) Filed: Feb. 6, 2019

(65) Prior Publication Data

US 2019/0238194 A1    Aug. 1, 2019

Related U.S. Application Data

(63) Continuation of application No. 14/976,928, filed on Dec. 21, 2015, now Pat. No. 10,256,878.

(Continued)

(51) Int. Cl.
*H04B 7/0452*    (2017.01)
*H04B 7/06*    (2006.01)
*H04B 7/08*    (2006.01)

(52) U.S. Cl.
CPC ......... *H04B 7/0452* (2013.01); *H04B 7/0695* (2013.01); *H04B 7/088* (2013.01)

(58) Field of Classification Search
CPC ..... H04B 7/0452; H04B 7/0695; H04B 7/088
See application file for complete search history.

(56) References Cited

U.S. PATENT DOCUMENTS

| 10,256,878 B2 | 4/2019 | Cariou et al. |
| 2007/0230373 A1 | 4/2007 | Li et al. |

(Continued)

OTHER PUBLICATIONS

Office Action for U.S. Appl. No. 14/976,928, dated Jul. 28, 2017.
(Continued)

*Primary Examiner* — Ricky Q Ngo
*Assistant Examiner* — Stephen N Steiner
(74) *Attorney, Agent, or Firm* — Jason H. Vick; Sheridan Ross, PC

(57) ABSTRACT

New wireless networks can perform enhanced beamforming training for a multiple access technique, such as orthogonal frequency division multiple-access (OFDMA). The configurations of the stations and the networks presented herein provide a multiple-station beam refinement protocol (MS-BRP) that may be used to train the transmit end and/or the receive end for the stations in a dense wireless local area network (WLAN). The MSBRP can have at least two phases. The first phase concurrently trains the receive side of multiple responder stations from one set of training signals sent from an initiator station. Then, each responder station can send training signals to the initiator station in a set of ordered phases associated with each responder station. The MSBRP eliminates inefficiencies associated with conducting multiple BRPs that include only pairs of stations.

20 Claims, 12 Drawing Sheets

Related U.S. Application Data

(60) Provisional application No. 62/219,702, filed on Sep. 17, 2015.

(56) References Cited

U.S. PATENT DOCUMENTS

| | | |
|---|---|---|
| 2010/0215027 A1 | 8/2010 | Liu et al. |
| 2011/0080898 A1* | 4/2011 | Cordeiro .............. H04B 7/0619 370/338 |
| 2011/0128929 A1 | 6/2011 | Liu et al. |
| 2015/0244432 A1 | 8/2015 | Wang |
| 2016/0119043 A1* | 4/2016 | Rajagopal ............. H04B 7/063 370/329 |

OTHER PUBLICATIONS

Office Action for U.S. Appl. No. 14/976,928, dated Feb. 8, 2018.
Office Action for U.S. Appl. No. 14/976,928, dated Jun. 29, 2018.
Notice of Allowance for U.S. Appl. No. 14/976,928, dated Dec. 5, 2018.

* cited by examiner

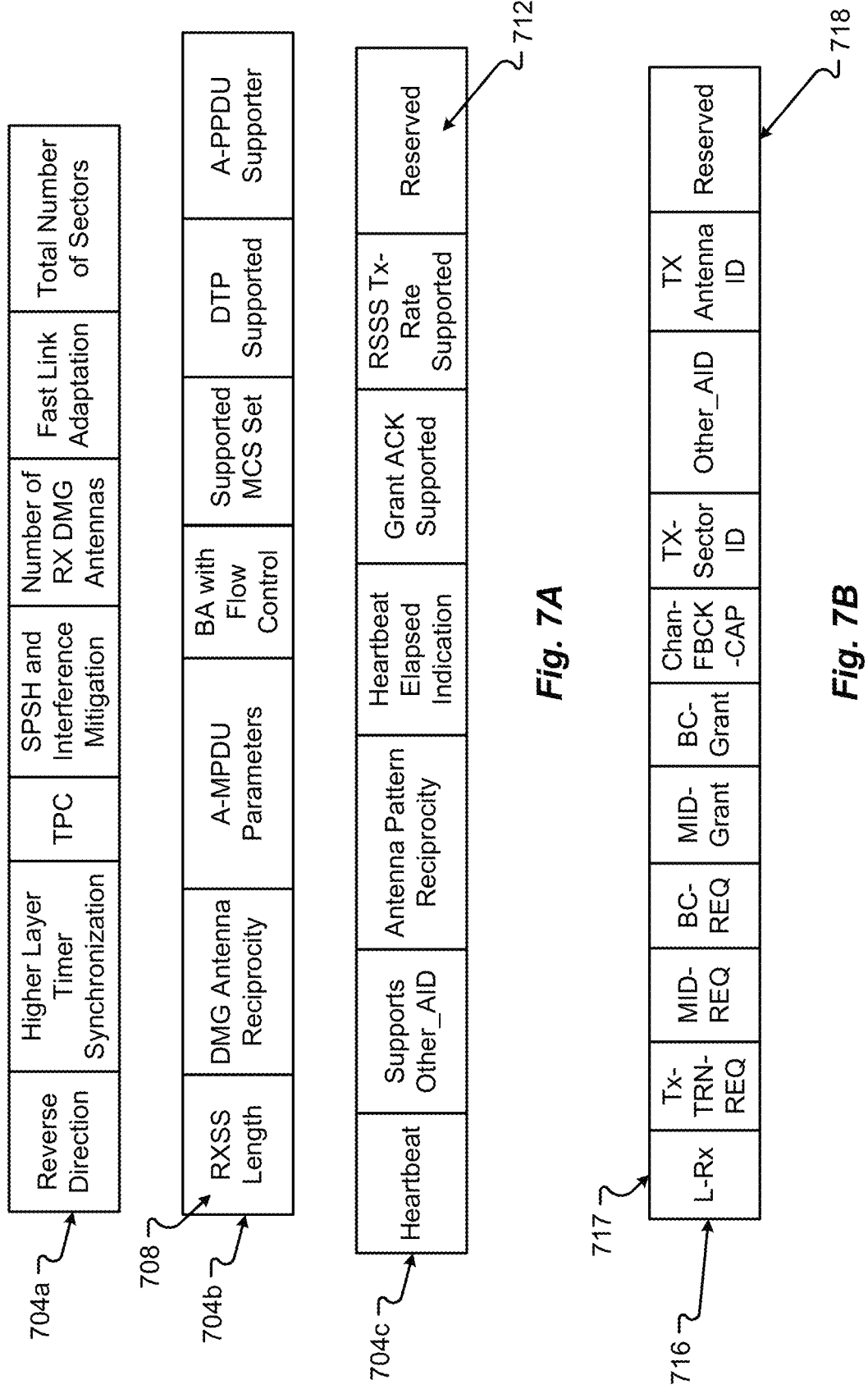

METHOD, WIRELESS DEVICE, AND COMPUTER READABLE MEDIUM FOR CONDUCTING A MULTIPLE STATION BEAM REFINEMENT PROTOCOL IN A WIRELESS NETWORK

CROSS REFERENCE TO RELATED APPLICATIONS

This application is a Continuation of U.S. patent application Ser. No. 14/976,928, filed Dec. 21, 2015, which claims priority to U.S. Provisional Application No. 62/219,702, filed Sep. 17, 2015, entitled "WIRELESS DEVICE, METHOD, AND COMPUTER READABLE MEDIA FOR MULTI STATION BEAM REFINEMENT PHASE IN WIRELESS LOCAL AREA NETWORKS," each of which are incorporated herein by reference for all that it teaches and for all purposes.

TECHNICAL FIELD

Embodiments pertain to wireless communications in a wireless local-area network (WLAN). Some embodiments relate to beam forming training. Some embodiments relate to Institute of Electrical and Electronic Engineers (IEEE) 802.11 and some embodiments relate to IEEE 802.11ay. Some embodiments relate to next generation 60 gigahertz (NG60) and/or task group for 802.11ay (TGay). Some embodiments relate to a multiple station beam refinement protocol that is initiated by a trigger frame from an initiator station.

BACKGROUND

Users of wireless networks often demand more bandwidth and faster response times. However, the available bandwidth may be limited. Moreover, it may be difficult to communicate with wireless devices operating with different operating characteristics and with a different number of antennas. Additionally, wireless devices may operate with different communication standards.

BRIEF DESCRIPTION OF THE DRAWINGS

The present disclosure is illustrated by way of example and not limitation in the figures of the accompanying drawings, in which like references indicate similar elements and in which:

FIG. 7A is a data diagram illustrating an embodiment of a frame including information about a MSBRP;

FIG. 7B is another data diagram illustrating an embodiment of a frame including information about a MSBRP;

DETAILED DESCRIPTION

Figure 1:
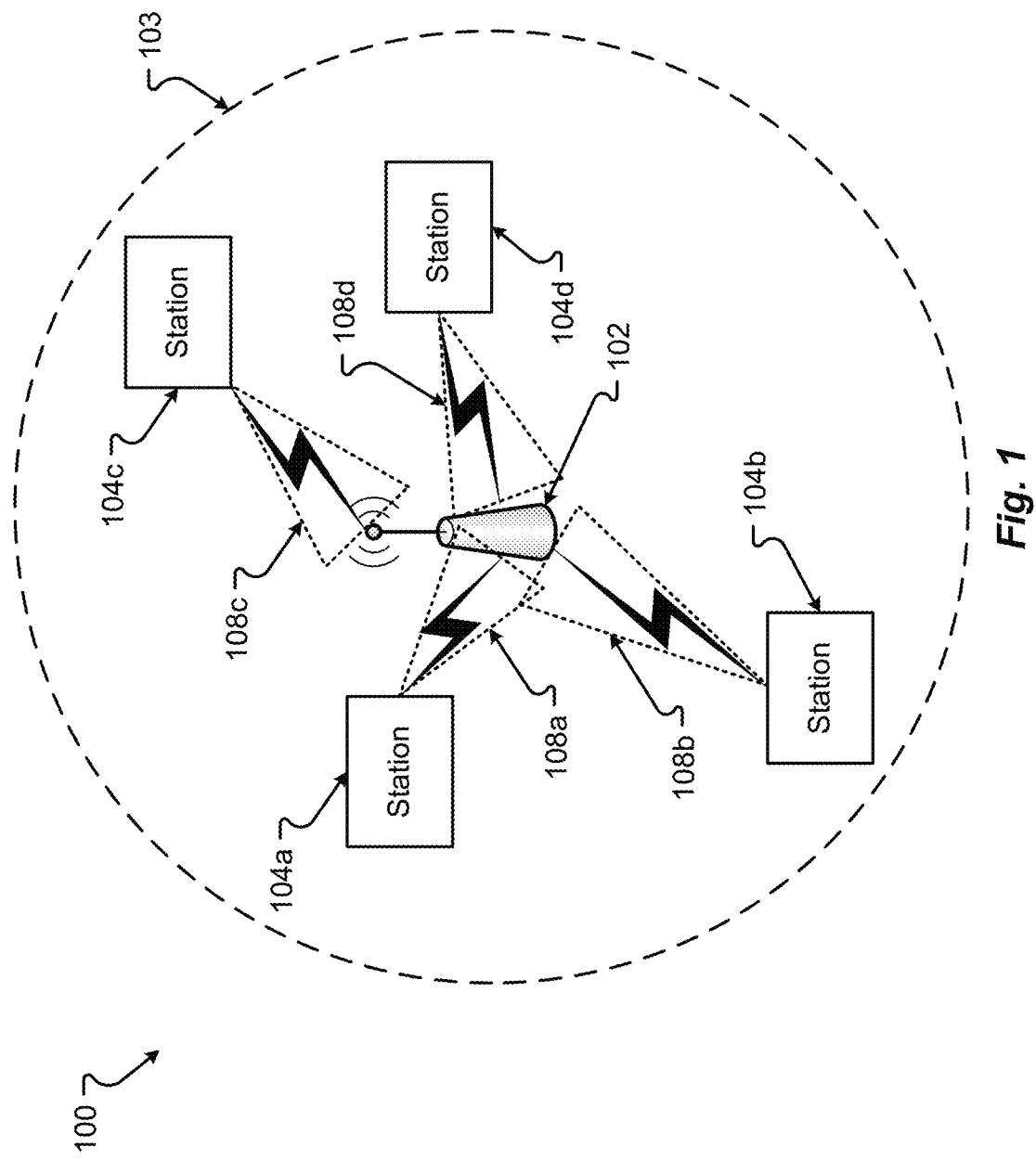
FIG. 1 is a block diagram illustrating an embodiment of a WLAN environment.

Embodiments herein are generally directed to wireless communications systems. Various embodiments are directed to wireless communications performed according to one or more wireless communications standards. Some embodiments may involve wireless communications performed according to High-Efficiency Wi-Fi standards developed by the IEEE 802.11 High Efficiency WLAN (HEW) Study Group. Various embodiments may involve wireless communications performed in accordance with an Institute of Electrical and Electronics Engineers (IEEE) 802.11ax or other standard(s), whether adopted or proposed. Some embodiments may involve wireless communications performed in accordance with the DensiFi Specification Framework Document (SFD).

Some embodiments may additionally or alternatively involve wireless communications according to one or more other wireless communication standards. Examples of other wireless communications technologies and/or standards that may be used in various embodiments may include—without limitation—other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, IEEE 802.11ah, and/or IEEE 802.11ay standards, Wi-Fi Alliance (WFA) wireless communication standards, such as, Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above.

Some embodiments may involve wireless communications performed according to one or more broadband wireless communication standards. For example, various embodiments may involve wireless communications performed according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Additional examples of broadband wireless communication technologies/standards that may be utilized in some embodiments may include—without limitation— Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

FIG. 1 illustrates an example of an operating environment 100 which may be representative of various configurations described herein. The WLAN 103 may comprise a basic service set (BSS) that may include a master station 102 and one or more other stations (STAs) 104. The master station 102 may be an access point (AP) using the IEEE 802.11 to transmit and receive. Hereinafter, the term AP will be used to identify the master station 102. The AP 102 may be a base station and may use other communications protocols as well as the IEEE 802.11 protocol. The IEEE 802.11 protocol may be the IEEE 802.11ax or later standard. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The STAs 104 may include one or more high-efficiency wireless (HEW) (as illustrated in, e.g., the IEEE 802.11ax standard) STAs 104 and/or one or more legacy (as illustrated in, e.g., the IEEE 802.11n/ac standards) STAs 104. The legacy STAs 104 may operate in accordance with one or more of IEEE 802.11 a/b/g/n/ac/ad/af/ah/aj, or another legacy wireless communication standard. The HEW STAs 104 may be wireless transmit and receive devices, for example, a cellular telephone, a smart telephone, a handheld wireless device, wireless glasses, a wireless watch, a wireless personal device, a tablet, or another device that may be transmitting and receiving using a IEEE 802.11 protocol, for example, the IEEE 802.11ax or another wireless protocol. In the operating environment 100, an AP 102 may generally manage access to the wireless medium in the WLAN 103.

Within the environment 100, one or more STAs 104a, 104b, 104c, 104d may associate and/or communication with the AP 102 to join the WLAN 103. Joining the WLAN 103 may enable STAs 104a-104d to wirelessly communicate with each other via the AP 102, with each other directly, with the AP 102, or to another network or resource through the AP 102. In some configurations, to send data to a recipient (e.g., STA 104a), a sending STA (e.g., STA 104b) may transmit an uplink (UL) physical layer convergence procedure (PLCP) protocol data unit (PPDU) comprising the data to AP 102, which may then send the data to the recipient STA 104a, in a downlink (DL) PPDU.

In some configurations, a frame of data transmitted between the STAs 104 or between a STA 104 and the AP 102 may be configurable. For example, a channel used in for communication may be divided into subchannels that may be 20 MHz, 40 MHz, or 80 MHz, 160 MHz, 320 MHz of contiguous bandwidth or an 80+80 MHz (160 MHz) of non-contiguous bandwidth. Further, the bandwidth of a subchannel may be incremented into 1 MHz, 1.25 MHz, 2.03 MHz, 2.5 MHz, 5 MHz and 10 MHz bandwidths, or a combination thereof, or another bandwidth division that is less or equal to the available bandwidth may also be used. The bandwidth of the subchannels may be based on a number of active subcarriers. The bandwidth of the subchannels can be multiples of 26 (e.g., 26, 52, 104, etc.) active subcarriers or tones that are spaced by 20 MHz. In some configurations, the bandwidth of the subchannels is 256 tones spaced by 20 MHz. In other configurations, the subchannels are a multiple of 26 tones or a multiple of 20 MHz. A 20 MHz subchannel may also comprise 256 tones for use with a 256 point Fast Fourier Transform (FFT).

At a given point in time, multiple STAs 104a-d, in the WLAN 103, may wish to send data. In some configurations, rather than scheduling medium access for STAs 104a-d in different respective UL time intervals, the AP 102 may schedule medium access for STAs 104a-d to support UL multi-user (MU) transmission techniques, according to which multiple STAs 104a-d may transmit UL MU PPDUs to the AP 102 simultaneously during a given UL time interval. For example, by using UL MU OFDMA techniques during a given UL time interval, multiple STAs 104a-d may transmit UL MU PPDUs to AP 102 via different respective OFDMA resource units (RUs) allocated by AP 102. In another example, by using UL MU multiple-input multiple-output (MU-MIMO) techniques during a given UL time interval, multiple STAs 104a-d may transmit UL MU PPDUs to the AP 102 via different respective spatial streams allocated by the AP 102.

To manage access, the AP 102 may transmit a HEW master-sync transmission, which may be a trigger frame (TF) or a control and schedule transmission, at the beginning of the control period. The AP 102 may transmit a time duration of the TXOP and sub-channel information. During the HEW control period, HEW STAs 104 may communicate with the AP 102 in accordance with a non-contention based multiple access technique such as OFDMA or MU-MIMO. This HEW technique is unlike conventional WLAN communications in which devices communicate in accordance with a contention-based communication technique, rather than a multiple access technique. During the HEW control period, the AP 102 may communicate with stations 104 using one or more control frames, and the STAs 104 may operate on a sub-channel smaller than the operating range of the AP 102. Also, during the control period, legacy stations may refrain from communicating.

During the HEW master-sync transmission, the STAs 104 may contend for the wireless medium with the legacy devices 106 being excluded from contending for the wireless medium during the HEW master-sync transmission. The trigger frame used during this HEW master-sync transmission may indicate an UL-MU-MIMO and/or UL OFDMA control period. The multiple-access technique used during the control period may be a scheduled OFDMA technique, or alternatively, may be a TDMA technique, a frequency division multiple access (FDMA) technique, or a SDMA technique.

The AP 102 may also communicate with legacy stations and/or HEW stations 104 in accordance with legacy IEEE 802.11 communication techniques. In some configurations, the AP 102 may also be configurable to communicate with HEW stations 104 outside the HEW control period in accordance with legacy IEEE 802.11 communication techniques, although this is not a requirement.

In accordance with some IEEE 802.11 embodiments, the AP 102 may operate to perform enhanced beamforming training (also referred to as beamform training, beam form training, or beam training) for a multiple access technique such as OFDMA or MU-MIMO. The beamform training may be conducted at least in portion according to a beam refinement protocol (BRP). The BRP may be used to train the transmit end and/or the receive end for the STAs 104 and/or the AP 102. The devices 104 and/or the AP 102 may be configured to perform the methods and functions herein described in conjunction with FIGS. 1-9.

In some configurations, beamform training is performed between two STAs 104. In dense WLAN environments, beamform training may need to be performed for many links between each of many STAs 104 and the AP 102 and/or between many STAs 104. It is generally inefficient to conduct beamform training with and among many STAs 104 because each STA 104 and the AP 102 must participate in several connection links (often the case for PCP/AP). This situation is also problematic for MU-MIMO. The configurations presented herein provide a MSBRP that eliminates at least some of the inefficiencies with beamform training in dense WLAN environments.

The MSBRP may be initiated with a first STA 104/102 and conducted with multiple other responder STAs 104. Hereinafter, the initiator will be described as the AP 102, but the configurations are limiter thereto. The STAs 104 and AP 102 can conduct the MSBRP to train the transmit beamforms 108a-108d from the STAs 104 to the AP 102 and the transmit beamforms (not shown in FIG. 1) from the AP 102 to the various STAs 104.

MSBRP signal diagrams 200-600 are shown in FIGS. 2-6. In FIGS. 2-6, an arrow may indicate information transmission between STAs 104, between a STA 104 and the AP 102, or between the AP 102 and one or more of the STAs 104. Tx knowledge may be information about the best Tx for another STA 104 or the AP 102, which may be stored for later transmission as feedback to the other STA 104 or AP 102.

As shown in FIGS. 2-6, the MSBRP signaling is separated into at least three phases. A first phase, identified by bracket 202, is a group or multi-STA phase that begins at a time identified by dashed line 228. A second phase 204, identified by bracket 204, is a per-STA phase. The per-STA phase 204 is divided into further portions associated with each STA 104 involved in the MSBRP 200-600. In the MSBRPs 200-600 shown in FIGS. 2-6, the per-station phase 204 is divided into three portions associated with a first STA 104a, a second STA 104b, and a third STA 104c. The portion associated with the first STA 104a begins at a time associated with dashed line 230. The portion associated with the second STA 104b begins at a time associated with dashed line 232. The portion associated with the third STA 104c begins at a time associated with dashed line 234. The final phase, identified by bracket 206, is a termination phase that begins at a time identified by dashed line 236. The three phases 202-206 may be preceded by an initiation process that orders and begins the MSBRP signaling.

Figure 2:
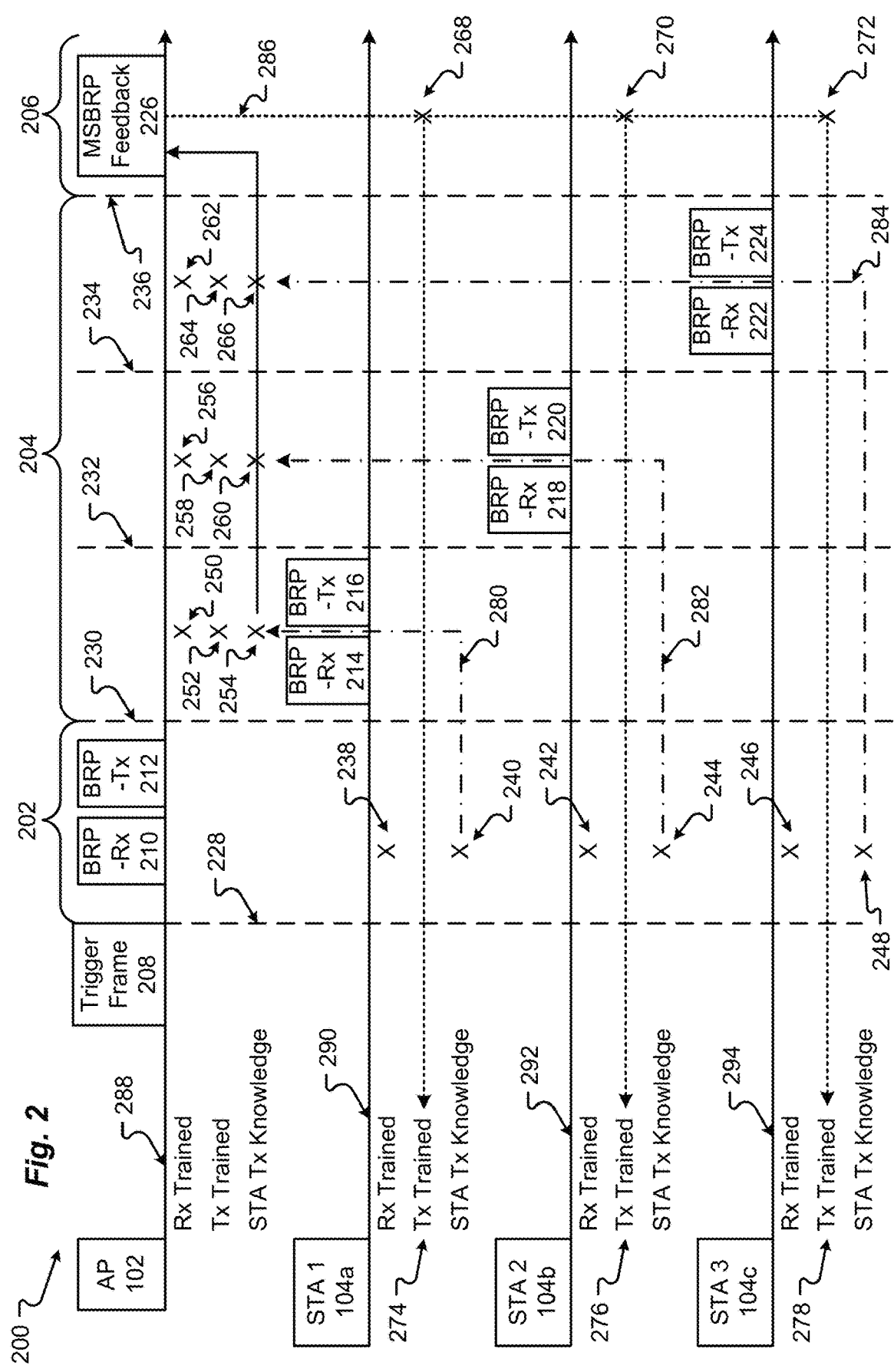
FIG. 2 is a signal diagram illustrating a beam refinement protocol (BRP) having a multiple station phase.
Figure 3:
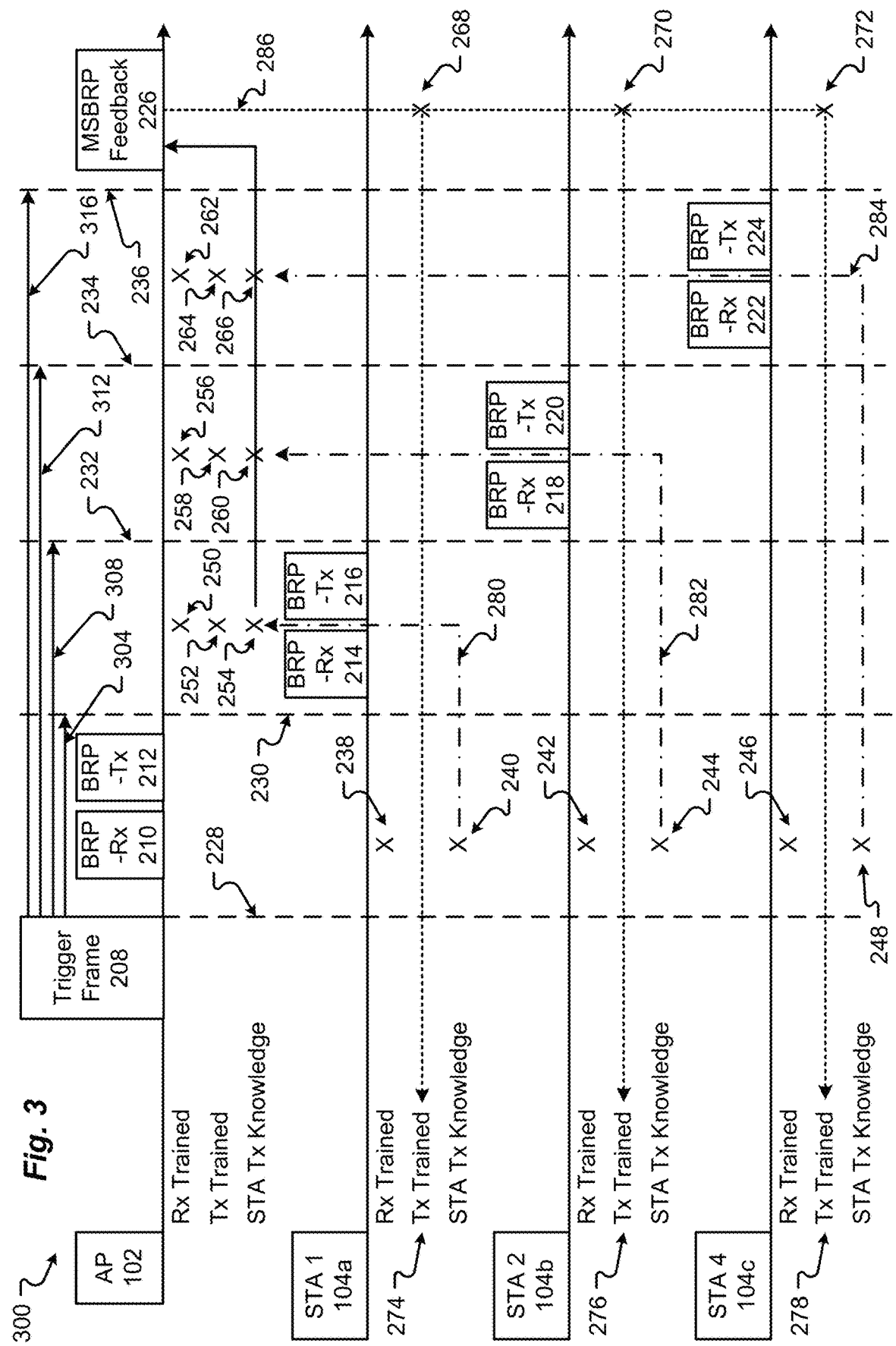
FIG. 3 is another signal diagram illustrating a multiple station beam refinement protocol (MSBRP)
Figure 4:
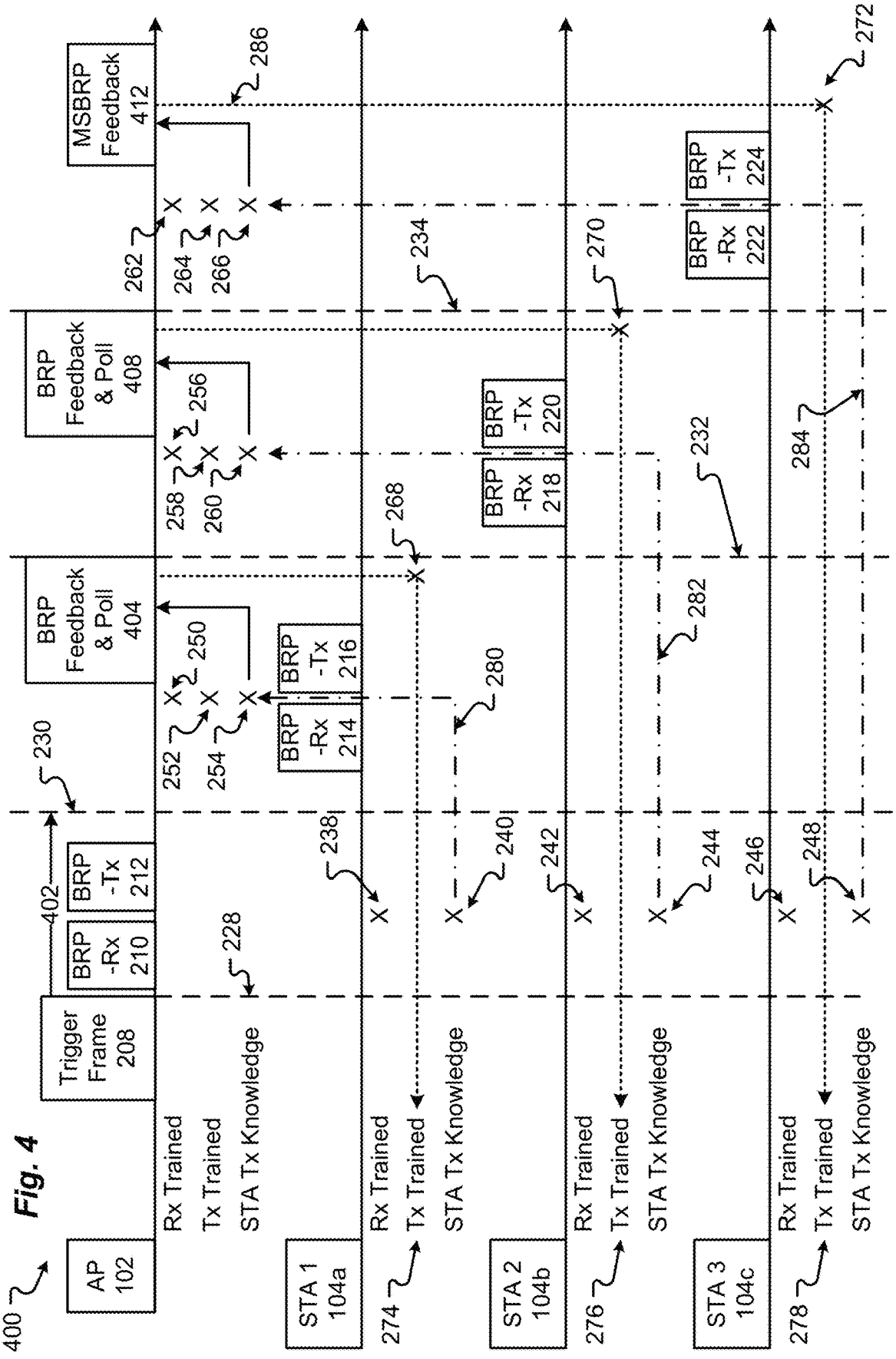
FIG. 4 is another signal diagram illustrating a MSBRP.
Figure 5:
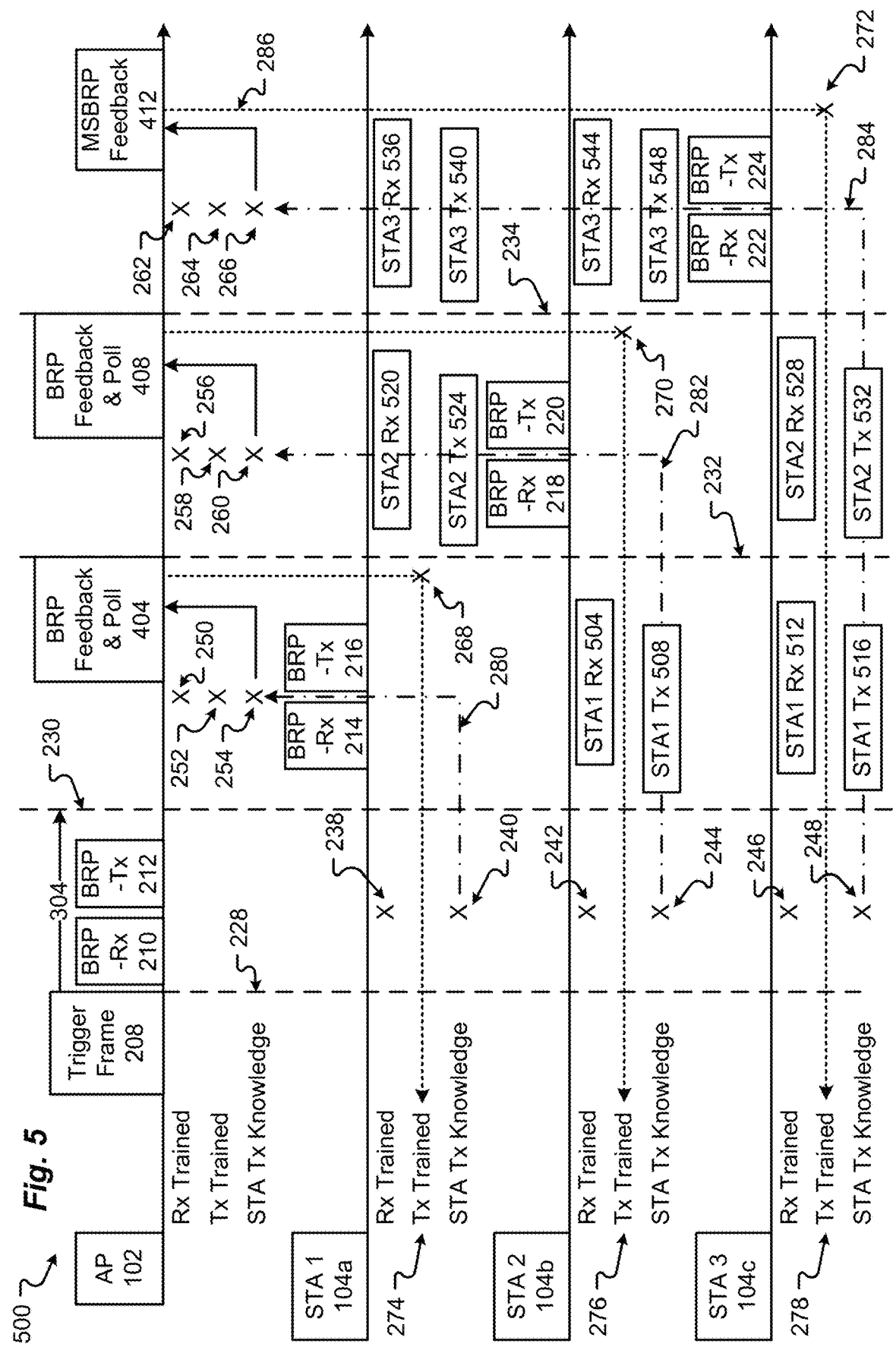
FIG. 5 is another signal diagram illustrating a MSBRP.
Figure 6:
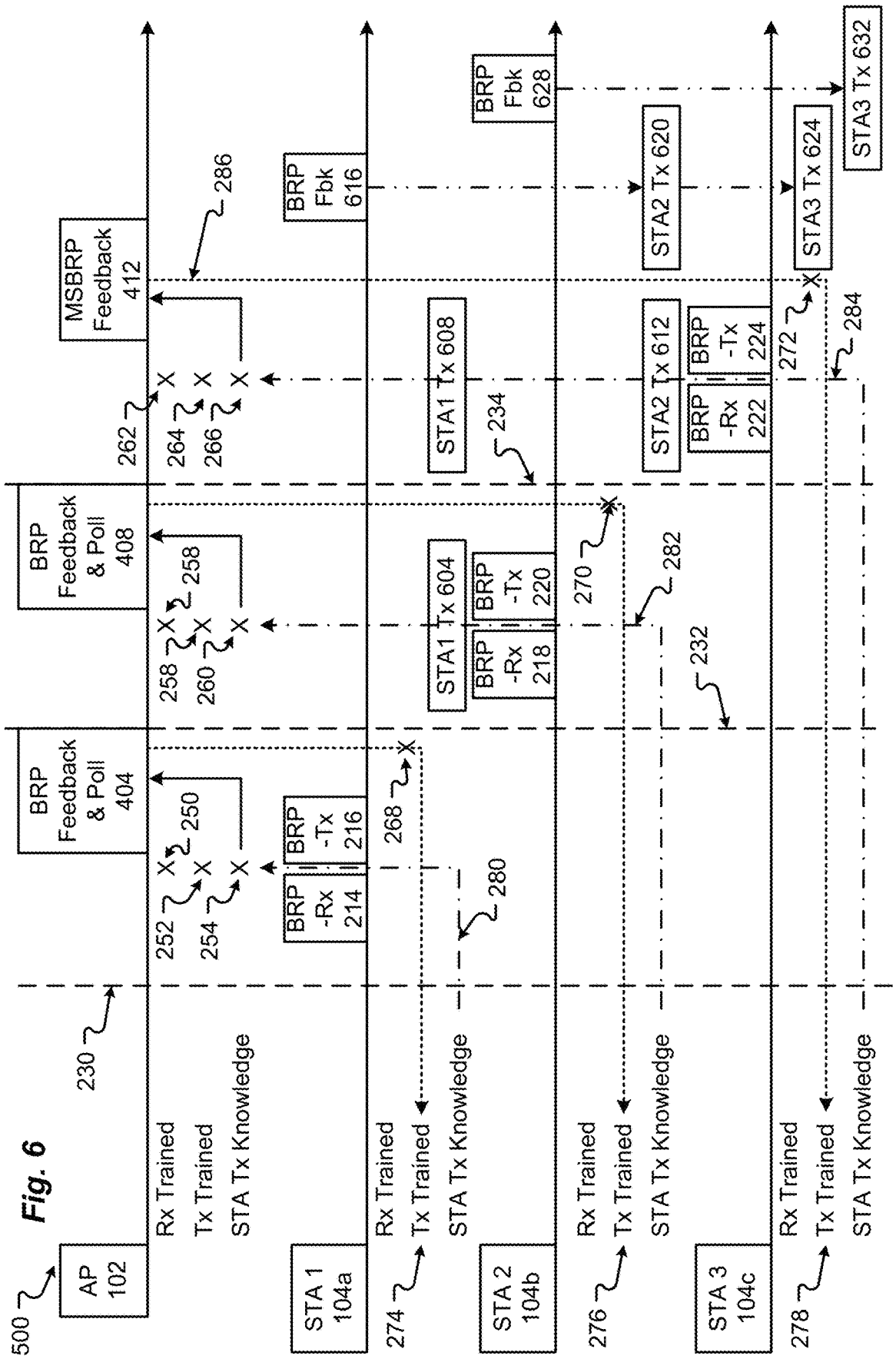
FIG. 6 is another signal diagram illustrating a MSBRP.

FIG. 2 illustrates a MSBRP 200 with a scheduled per-STA phases 204. FIG. 3 illustrates a MSBRP 300 with a triggered per-STA phase 204. FIG. 4 illustrates a MSBRP 400 with a polled per-STA phase 204. FIGS. 5 and 6 illustrate a MSBRP 500 with a polled per-STA phase 204 and STA-to-STA BRP training. Portions of the various processes 200-500 can be intermixed or changed to accommodate the efficiency goals and desires for the WLAN 103.

To initiate the MSBRP, the AP 102 may provide information to the STAs 104 to indicate when or possibly how the MSBRP will be conducted. The initiation information may be included in one or more frames of data. For example, the Directional Multi-Gigabit (DMG) STA Capability Information 704a, 704b, 704c as shown in FIG. 7A. The scheduling information can be included in the RXSS Length field 708, in the reserved field 712, or in another field of frame 704. In other configurations, the AP 102 or a STA 104 may send a BRP Request 716, as shown in FIG. 7B, to initiate the MSBRP. The required data to initialize the MSBRP may be included in the reserved field 718 or in one of the other fields.

Figure 7C:
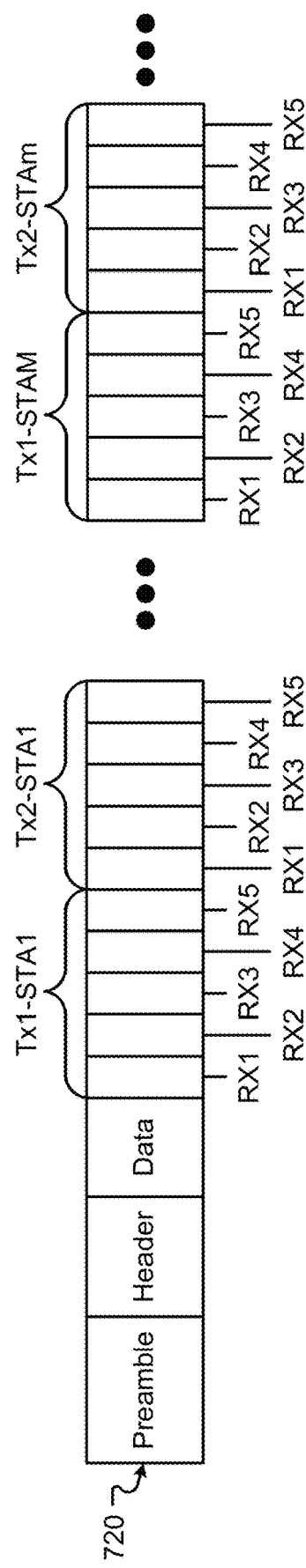
FIG. 7C is another data diagram illustrating an embodiment of a frame including information about a MSBRP.
Figure 7D:
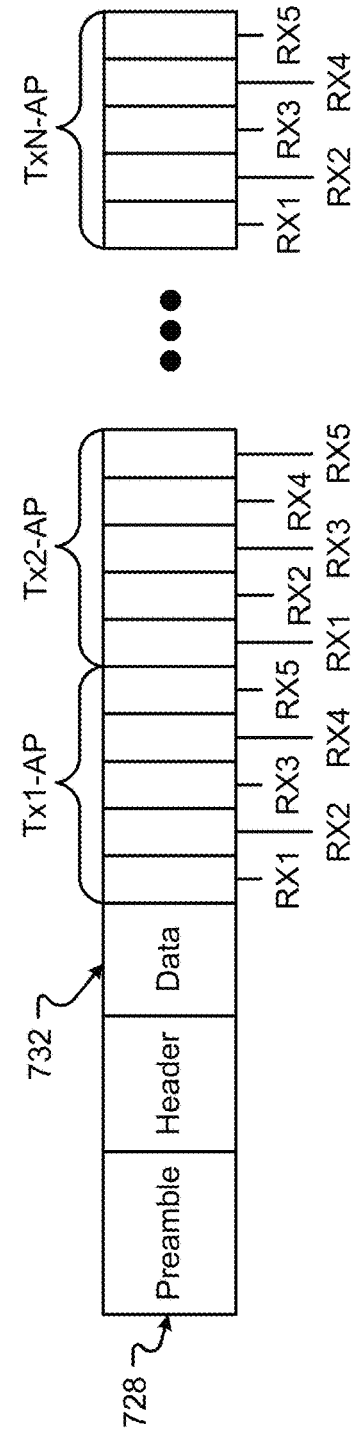
FIG. 7D is another data diagram illustrating an embodiment of a frame including information about a MSBRP.
Figure 7E:
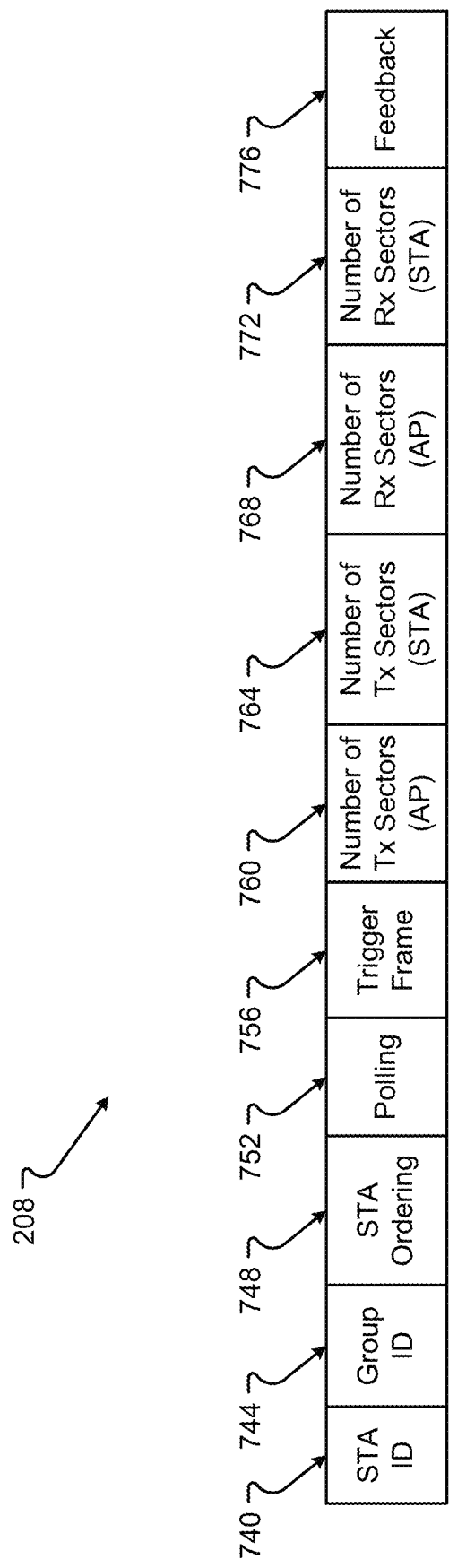
FIG. 7E is another data diagram illustrating an embodiment of a frame including information about a MSBRP.

The AP 102 can also initiate the MSBRP 200-600 with a trigger frame 208 that precedes time 228. The trigger frame 208 can include one or more of, but is not limited to, the following elements (as shown in FIG. 7E):

An identifier (ID) 740 for the two or more STAs 104 that will participate in the MSBRP process. The Association ID (AID) of each STA 104 can be used to identify the participants. Additionally or alternatively, the trigger frame 208 can include a group ID 744 to identify a group of two or more STAs 104 that will participate in the MSBRP process.

STA ordering information 748 can indicate in what order or when each STA 104 should transmit Rx and Tx signals during the per-STA phase 204.

If not implicit, the method of starting each phase 202-206 or each portion of the per-STA phase 204 at times 230-234 may be provided. Thus, the trigger frame 208 can include a polling indicator 752, indicating that each phase will be proceeded by a poll from the AP 102, or a trigger frame indicator 756, indicating that a trigger frame 208 will be sent before each phase. It is also possible to include scheduling information in one or more of these fields 752, 756. The scheduling information can indicate a discrete time or a time from the start of the MSBRP at which the next phase will begin.

And, the trigger frame 208 can also include one or more MSBRP parameters (similar to BRP parameters used in a non-MSBRP proves). The MSBRP parameters can include BRP parameters common to all STAs 104 or specific to only one or more of the STAs 104. For example, the MSBRP parameters may include a number (nb) of Tx sectors 760 on the initiator or AP 102 side, a nb of Tx sectors 764 on the responder or STA 104 side, a nb of Rx sectors 768 on the AP 102 side, a nb of Rx sectors 772 on the STA 104 side, and/or how the best Tx/Rx information is to be fed back 776 (e.g., best sector, channel estimation, or received signal strength indication (RSSI) for all or some of the sectors).

The fields 740-776 shown in FIG. 7E are described as being part of the trigger frame 208. However, one or more of the fields can be included in other data frames, such as, the DMG STA Capability Information 704 or the BRP Request 716. As explained previously, for clearer scheduling, the per-STA phase 204 of the MSBRP may be divided into a portion associated with each STA 104a-c. In each per-STA portion, only one STA 104 can transmit BRP-Rx and BRP-Tx. As shown in FIG. 2, the AP 102 transmits along line 288, STA 1 104a transmits along line 290, STA 2 104b transmits along line 292, and STA 3 104c transmits along line 294. Only three STAs 104 are shown participating in the MSBRP 200-600. However, any number of two or more STAs 104 and the AP 102 may participate in the MSBRP 200-600.

The multi-STA phase 202 may start at time 228 as indicated by the AP 102 sending the trigger frame 208 to the STAs 104a-104c. During or before the multi-STA phase 202, the AP 102 can select a list of candidate Tx sectors to send for each STA 104. If the AP 102 chooses N sectors per STA 104, then the AP 102 will send N times M number of Tx sectors. In one configuration, the AP 102 can transmit a first set of N Tx sectors for STA 1 104a, then N Tx sectors for STA 2 104b, and then N Tx sectors for STA 3 104c. This set of sectors 720 (which may be a sector sweep (SSW) frame) may be as displayed in FIG. 7C. In FIG. 2, the BRP-Rx sectors 210 and the BRP-Tx sectors 212 are sent by the AP 102 to the STAs 104 in the multi-STA phase 202. It should be noted that the BRP-Tx and BRP-Rx are shown as two separate frames, but the BRP-Tx and BRP-Rx may be sent by the AP 102 or the STAs 104 as a single frame (BRP-Rx/Tx).

The STAs 104 can then locally perform training for the receive side at the STA 104 based on the received BRP-Tx and/or BRP-Rx. Thus, each STA 104, during the multi-STA phase 202, can concurrently perform Rx training for transmissions from the AP 102 to know the best Rx sector 238, 242, 246 to use for transmission from the AP 102, and can learn which of the AP 102 transmit sectors is the best for that STA's link (STA Tx Knowledge 240, 244, 248). As the STAs 104 perform only Rx training during the multi-STA phase 202, the STAs 104 can use the best Rx sector during the BRP-Tx transmission. All STAs 104 can conserve or store the best Tx knowledge to provide this STA Tx knowledge 240, 244, 248 back to the AP 102 during the per-STA phase 204.

During the multi-STA phase 202, each STA 104 can choose the Rx sectors. A maximum number of Rx sectors 760 may be signaled in the trigger frame 208. The STA 104 can then choose the best Rx sectors for the AP 102. When the AP 102 transmits with the Tx-sectors corresponding to the receiving STA 104*a*, the receiving STA (e.g., STA 104*a*) trains the best Rx sectors. When AP 102 transmits with the Tx-sectors corresponding to another STA (e.g., STA 104*b*), the receiving STA 104*a* can learn the interference present from AP 102 transmission towards that other STA 104. The BRP-Tx and Rx 210, 212 sent from the AP 102 may not need to be transmitted as many times as the number of STAs 104. Thus, further efficiencies are realized in the MSBRP.

The MS BRP 200 then continues with the per-STA phase 204. The first STA 104*a* phase can start at time 230. The first STA 104*a* may know the time based on scheduling provided in the trigger frame 208. The scheduling could include a discrete time or an elapsed time from a start time (e.g., the start of the multi-STA phase 202 at time 228). The timing information for the other phases may also be included in the information provided by the AP 102 to begin the subsequent per-STA phase for STA 2 104*b* may then start at time 232, and the subsequent per-STA phases for STA 3 104*c* may then start at time 234. Likewise, the termination phase 206 may begin at time 236.

In other MSBRP configurations 300, the AP 102 can send another trigger frame 304, as shown in FIG. 3, to start the per-STA phase for STA 1 104*a*. The subsequent per-STA phase for STA 2 104*b* may then start at time 232 upon receipt of trigger from 308, and the subsequent per-STA phases for STA 3 104*c* may then start at time 234 upon receipt of trigger from 312. Likewise, the termination phase 206 may begin at time 236 upon receipt of trigger frame 316.

In still another MSBRP configuration 400, the AP 102 can send a poll/trigger frame 402, as shown in FIG. 4, to start the per-STA phases for STA 1 104*a*. The subsequent per-STA phase for STA 2 104*b* may then start at time 232 upon receipt of a poll with BRP feedback information 404. The next per-STA phase for STA 3 104*c* may then start at time 234 upon receipt of the poll with BRP feedback information 408. The termination phase 206 may begin at later time upon receipt of a poll (not shown) or as scheduled in the trigger frame 208. The polls with BRP feedback information 404, 408 can include information for the STA that just completed the per-STA phase. For example, the AP 102 can provide Tx information 268 to STA 1 104*a* for Tx training 274 in the Poll with BRP feedback information 404. Similarly, the AP 102 can provide Tx information 270 to STA 2 104*b* for Tx training 276 in the Poll with BRP feedback information 408.

STA 3 104*c* can receive the Tx information 272 in a MSBRP feedback 412 (which may be a SSW acknowledgement (ACK)) in the termination phase 206, which may only include information for STA 3 104*c*.

Each STA 104*a*-104*c* can, either before or during the per-STA phase 204, select a list of candidate Tx sectors for the AP 102. The AP 102 can choose the Rx sector for Rx training towards the transmitting STA 104. The Tx sectors 728 sent from the STAs 104 may be as shown in FIG. 7D (which may be a SSW frame). Each STA 104 can send the candidate Tx sectors selected to the AP 102. The Tx signal 728 can also include a data field 732 that can include the Tx knowledge 240, 244, 248 stored during the multi-STA phase 202. Thus, each STA 104 can use the Tx signal 728 to indicate back to the AP 102 the best transmit sector for the AP 102 to send data to the STA 104.

During each STA's 104 per-STA phase, the STA 104 transmits a BRP-Rx 214, 218, 222 followed by a BRP-Tx 216, 220, 224 (using the parameters provided in the trigger frame 208 or in the polled frame from the initiator). The AP 102 can then perform Rx training and learn the best Tx sector to feed back to that STA 104 in later feedback 226 (which may be a SSW acknowledgement (ACK)).

The BRP-Rx 214, 218, 222 or the BRP-Tx 216, 220, 224 carries the information of the best Tx sector 240, 244, 248 from the AP 102 (learned during the multi-STA phase 202), which is fed back to the AP 102 as signals 280, 282, and 284. The best Tx sector 240, 244, 248 can be included in the data field 732 or other field of signal 728. During each portion of the per-STA phase 204, the AP 102 can determine and store the best Rx vector 250, 256, 262 based on the BRP-Rx 214, 218, 222 and/or the BRP-Tx 216, 220, 224. Further, the AP 102 can store the Tx information 252, 258, 264 sent by the STAs 104. Based on the Rx vector 250, 256, 262, the AP can also store STA Tx knowledge 254, 260, 266 to send back the STAs 104 as feedback. In some configurations, at the end of each portion of the per-STA phase 204, the AP 102 sends a frame (can be a BRP feedback frame) that carries the best Tx sector 254, 260, 266 from the responder STA 104. Alternatively, at the end of the last portion of the per-STA phase 204, the AP 102 sends a frame 226 to responder STAs 104 (broadcasted in signal 286) to feed the STAs 104 the best Tx sector 268, 270, 272. The STAs 104 can then use this feedback 226 to establish Tx training 274, 276, and 278.

In the BRP-Rx 210, the AP 102 sends multiple TRN-R fields with omni-transmission. During each TRN-R, the receiving STAs 104 can apply a different Rx sector and then select the one that produces the highest receive signal power. The number of TRN-R fields may be selected as the max number of sectors from the receiver STA 104. There may be several receiving STAs 104, with potentially different numbers of Rx sectors for each STA 104. As explained above, some configurations use a single Rx sector value (number of TRN-R fields) so that Rx beamforming training can be performed optimally for all responder STAs 104.

Some configurations use the max number of Rx sectors among all responder STAs 104 as the number of TRN-R fields that will be sent in the BRP-Rx 210 from the AP 102. This configuration enables the WLAN 103 to perform complete Rx beamform training in all STAs 104. Thus, the MSBRP is more efficient.

Usually, the number of TRN-R fields is selected as the max number of sectors from the receiver STAs 104. There may be multiple receiving STAs 104 in the MSBRP. Some configurations use a single Rx sector value (number of TRN-R fields) so that Rx beamform training can be performed optimally for all responder STAs 104. The max number of Rx sectors among all responder STAs 104 may be used as the single Rx sector value, the number of TRN-R fields that will be sent in the BRP-Rx 210 from the AP 102. In other situations, STAs 104 advertise their capabilities to the AP 102, especially the number of Rx sectors. The STA 104 may use the DMG capability information field 704 shown in FIG. 7A. The RXSS length 708 is currently carrying this information.

If the STA 104 is capable of performing MIMO reception, the STA 104 can perform Rx sector signal power estimation on different sectors at the same time. This ability leads to a need for less TRN-R transmitted from the AP 102. For MIMO-Rx-capable STAs 104, a new field may be included in the capabilities, such as RXSS MIMO length. Alternatively, the RXSS field 708 may convey the number of TRN-R that are needed by the STA 104, taking into account their total number of sectors, and their capabilities to perform simultaneous sector training on each receive chain.

The AP 102 can also get that information (requested number of TNR-R to be sent in BRP-Rx) from the value of the L-RX field 717 requested by each receiver STA 104 from a previously-received BRP Request field 716, as shown in FIG. 7B. Once the AP 102 gets this Rx sector value information from all STAs 104, the AP 102 can compute the number of TRN-R to send in the multi-STA BRP-Rx 210, by using the Max value among the RxSS lengths fields 708 from all responder STAs 104 or among the L-RX field values 717 from all responder STAs 104.

During the multi-STA BRP phase 202, the BRP-Rx 210, sent by the AP 102, includes as many TRN-R as the value computed above. During the transmission of the BRP-Rx 210 by the AP 102, the responder STAs 104 use different sectors on each TRN-R field. STAs 104 that have fewer Rx sectors than the number of TRN-R fields can either ignore the remaining TRN-R fields, or use the excess TRN-R fields to refine further the receive signal power estimation on some of their Rx sectors.

As is shown in FIGS. 6 and 7, the MSBRP 500 can enable beamform training for links between the different responder STAs 104. In some situations, the MSBRP 500 enables beamform training between an AP 102 and multiple responder STAs 104 while concurrently enabling beamform training between the STAs 104. To perform beamform training between the STAs 104, feedback information is exchanged during and/or after the per-STA phase 204. As illustrated in FIGS. 5 and 6, all STAs 104 participating in the MSBRP 500 can "listen" to all transmitted frames and perform beamform training with other STAs 104.

FIG. 5 illustrates the STA-toSTA MSBRP 500, which can include a polled per-STA phase 204, as described in conjunction with FIG. 4. The per-STA phase 204 can begin at time 230 after a trigger frame 304 or other event occurs. During the first portion of the per-STA phase 204, which occurs between times 230 and 232, responder STA1 104 a can send BRP-Rx 214 and BRP-Tx 216 frames. The other STAs (e.g., STA 2 104*b* and STA 3 104*c*) can perform Rx beamform training 504, 512 based on the signals 214, 216 sent from STA 1 104*a*. Based on the Rx training 504, STA 2 104*b* can determine a best Tx sector 508 from STA1 104*a* for the link between STA1 104*a* and STA 2 104*b*. Likewise, based on the Rx training 512, STA 3 104*c* can determine a best Tx sector 516 from STA1 104 a for the link between STA1 104*a* and STA 3 104*c*.

During a second portion (between times 232 and 234) of the per-STA phase 204, STA2 104*b* can transmit BRP-Rx 218 and BRP-Tx 220. The BRP-Rx 218 and BRP-Tx 220 can include the STA 1 Tx information 508. STA 1 104*a* can receive the STA 2 Tx information 524 in the BRP-Rx 218 and/or BRP-Tx 220 and also train the receive side as STA2 Rx information 520. The STA2 Rx information 520 can also be used by STA 1 104*a* to determine the best Tx sector that should be used by STA 2 104*b*. STA 1 104*a* can provide this feedback later in the MSBRP. Thus, as shown in FIG. 5, when STA 2 104*b* transmits BRP-Rx 218, the BRP-Rx 218 that signal(s) can include the feedback of: (a) the best Tx sector 244 for the AP 102 (as described above in conjunction with FIGS. 2-4), and (b) the best Tx sector 524 for STA1 104*a*.

During a third portion (between times 234 and 236 or after time 234) of the per-STA phase 204, STA 3 104*c* can transmit BRP-Rx 222 and BRP-Tx 224. The BRP-Rx 222 and BRP-Tx 224 can include the STA 1 Tx information 540 and the STA 2 Tx information 548. STA 1 104*a* can receive the STA 2 Tx information 540 in the BRP-Rx 222 and BRP-Tx 224 and also train the receive side as STA3 Rx information 536. The STA2 Rx information 536 can also be used by STA 1 104*a* to determine the best Tx sector that should be used by STA 3. STA 1 104*a* can provide this feedback later in the MSBRP. STA 2 104*b* can receive the STA 3 Tx information 548 in the BRP-Rx 222 and BRP-Tx 224 and also train the receive side as STA3 Rx information 544. The STA3 Rx information 544 can also be used by STA 2 104*b* to determine the best Tx sector that should be used by STA 3. STA 2 104*b* can provide this feedback later in the MSBRP. Thus, as shown in FIG. 5, when STA 3 104*c* transmits BRP-Rx 222 and/or BRP-Tx 224, the BRP-Rx 222 and/or BRP-Tx 224 can include the feedback of: (a) the best Tx sector 248 for the AP 102 (as described above in conjunction with FIGS. 2-4), (b) the best Tx sector 540 for STA1 104*a*, and (c) the best Tx sector 548 for STA2 104*b*.

As a STA 104 can only feedback the best Tx sectors for the links from the STAs 104 that have already sent BRP-Tx, not all the links are fully trained in the Tx side after STA 3 104*c* sends BRP-Rx 222, the BRP-Rx 224. Some configurations may enable simultaneous cross-responder STA beamform training (partial Tx and all Rx side), without any new feedbacks. However, to complete the Tx side, other configurations can include further feedback that may occur in the termination phase 206, as shown in FIG. 6. As shown, at some time during the termination phase 206, either before or after the AP 102 sends feedback 412, STA 1 104*a* can send the best Tx sector 620 for STA 2 104*b* and/or the best Tx sector 624 for STA 3 104*c* as feedback frame 616. Similarly, STA 2 104*b* can send the best Tx sector 632 for STA 3 104*c* as feedback frame 628. Thus, BRP feedbacks frames 616, 628 sent by STAs 104*a*, 104*b* estimate the best Tx sectors 620, 624, 632 for the links between the transmitter STAs 104*b*, 104*c* that sent their BRP-Tx after the first or second portions of the per-STA phase 204. In the example in FIG. 6, STA1 104*a* has to send the best STA 2 Tx sector 620 and the best STA 3 Tx sector 624 feedbacks to STA 2 104*b* and STA 3 104*c*. STA 2 104*b* has to send only the best STA3 Tx sector 632 to STA3 104*c*. The STA BRP-feedbacks 616, 628 can be triggered by the BRP feedback and poll frame 412 sent from the AP 102.

To conduct the STA-to-STA option of the MSBRP, additional fields may need to be added to the data structures described in conjunction with FIGS. 7A-7E. For example, the MSBRP trigger 206 that initiates the multi-STA phase 202 may indicate that cross-responder STAs 104 should or can perform beamform training for links between the STAS 104. Further, in the case where some responders STAs 104 have more Rx sectors than the AP 102, the BRP-Rx 214, 218, 222 sent from the responder STAs 104 may use a number of TRN-R fields equal to the max number of Rx sectors for all STAs 104 participating in the STA-to-STA option of the MSBRP.

Figure 8:
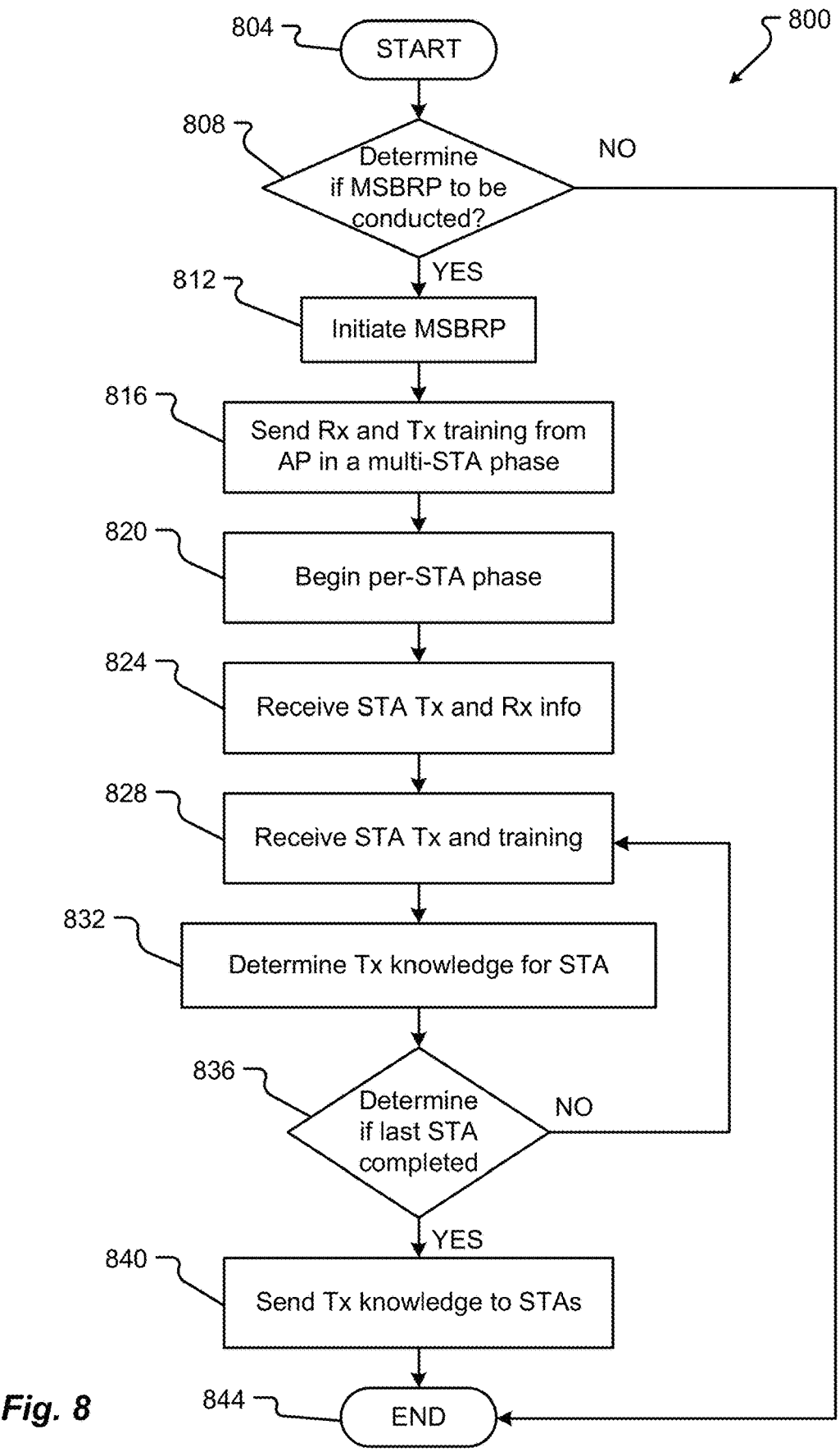
FIG. 8 is a flowchart illustrating a method for conducting a MSBRP.

An embodiment of the method 800, from the view of an AP or initiator/master station 102, for conducting MSBRP is shown in FIG. 8. Generally, the method 800 starts with a start operation 804 and ends with an end operation 844. The method 800 can include more or fewer steps or can arrange the order of the steps differently than those shown in FIG. 8. The method 800 can be executed as a set of computer-executable instructions, executed by a computer system or processing component, and be encoded or stored on a storage medium. Further, the method 800 can be executed by a gate or other hardware device or component in an Application Specific Integrated Circuit (ASIC), a Field Programmable Gate Array (FPGA), or other type of hardware device. Hereinafter, the method 800 shall be explained with reference to the systems, components, modules, software, data structures, etc. described herein.

The AP 102 can determine if conducting a MSBRP is needed, in step 808. The AP 102 (or initiator STA 102 or 104) may respond to an event and/or use information gleaned from the association of one or more STAs 104 within the WLAN 103 or other information to determine whether the three or more STAs 104 should conduct a MSBRP. If conducting a MSBRP is needed, the process 800 proceeds YES to step 812. However, if conducting a MSBRP is not needed, the process 800 proceeds NO to end step 844.

In step 812, the AP 102 may initiate the MSBRP. To initiate the MSBRP, the AP 102 may send the BRP information to two or more STAs 104. This MSBRP information can include any information described in conjunction with FIGS. 7A through 7E including timing information for when the multi-STA phase 202 of the MSBRP will begin and, possibly, the timing information for both the per-STA phase 204 and the termination phase 206 of the MSBRP. This MSBRP information may be provided in a MSBRP trigger 208 or in some other type of signal provided to the STAs 104. The trigger 208 may also provide information as to whether or not the per-STA phase 204 will be scheduled based on time or will be conducted based on polling, by the AP 102, of the STAs 104. The initiation information for the MSBRP may also include the order in which the STAs 104 will conduct their portion of the per-STA phase 204 of the MSBRP. The trigger 208 may also include information as to what the timing will be for the multi-STA phase 202, the per-STA phase 204, and the termination phase 206. The AP 102 may also include an indication as to whether STA-to-STA training will occur, meaning that STA 1 104A, STA 2 104B, and STA 3 104C may train their beam forms for those other STAs 104 during the MSBRP.

Upon starting the multi-STA phase 202, the AP 102 can send BRP-RX 210 and BRP-TX 212 and broadcast those signals to all STAs 104a-104c, in step 816. The BRP-RX 210 and BRP-TX 212 signals may be received by the STAs 104 and be used to determine their RX training 238, 242, 246 and also be used to determine AP 102 transmit knowledge 240, 244, 248. The AP 102 transmit knowledge 240, 244, 248 may be stored by the STAs 104 for later use in the per-STA phase 204 when the STAs 104 can send that information to the AP 102.

After sending the BRP-RX 210 and BRP-TX 212, the AP 102 can begin the per-STA phase 204, in step 820. The per-STA phase 204 may begin at a time indicated by dash line 230. This time 230 may have been indicated in the initial multi-STA BRP trigger 208 or may begin based on another trigger 304 sent, which may be a poll or some other type of signal. Once the per-STA phase 204 begins, the AP 102 waits for BRP RX 214 and BRP TX 216 to be sent and received from a first STA 104a, in step 824. The BRP RX 214 and BRP TX 216 can include the STA 1 104a AP transmit knowledge 240, which may be used for the transmit training 252. Based on the signals BRP RX 214 and BRP TX 216, the AP 102 may determine its receive training 250, in step 828. Thus, based on the signals BRP RX 214 and BRP TX 216, the AP 102 can know its receive and transmit training 250, 252.

Further, based on the received training 250, the AP 102 can store STA transmit knowledge 254 for later use in the termination phase 206 of the BRP process, in step 832. The process of receiving BRP RX and BRP TX from the STAs 104 continues through the other STAs 104b, 104c in the per-STA phase 204. As such, the AP 102 continues to conduct or identify its best sectors 256, 258, 262, 264 for receive and transmit for each STA 104b, 104c, and store the transmit knowledge 260, 266 for each STA 104b, 104c until the AP 102 determines that the last STA 104c has provided BRP RX 222 and BRP TX 224, in step 836. If it is determined that the last STA 104c has performed beamform training with the AP 102, the process 800 proceeds YES to step 840. However, if the process 800 is not completed, the process 800 proceeds NO to optional step 840, where the AP 102 sends another poll or BRP trigger 208 (or, e.g., poll 408) to the next STA 104. Then, the method 800 will return to step 824 to receive more BRP RX or BRP TX signals from another STA 104.

In step 840, the termination phase 206 begins at time indicated by dotted line 234. In this phase 206, the AP 102 can send the transmit knowledge 254, 260, 266 gleaned from the per-STA phase 204 to each of the STAs 104a through 104c. This Tx knowledge 254, 260, 266 may be included in a MSBRP Feedback packet 226, 412. From this feedback information 226, 412 each of the STAs 104a through 104c can complete Tx training for the AP 102.

Figure 9:
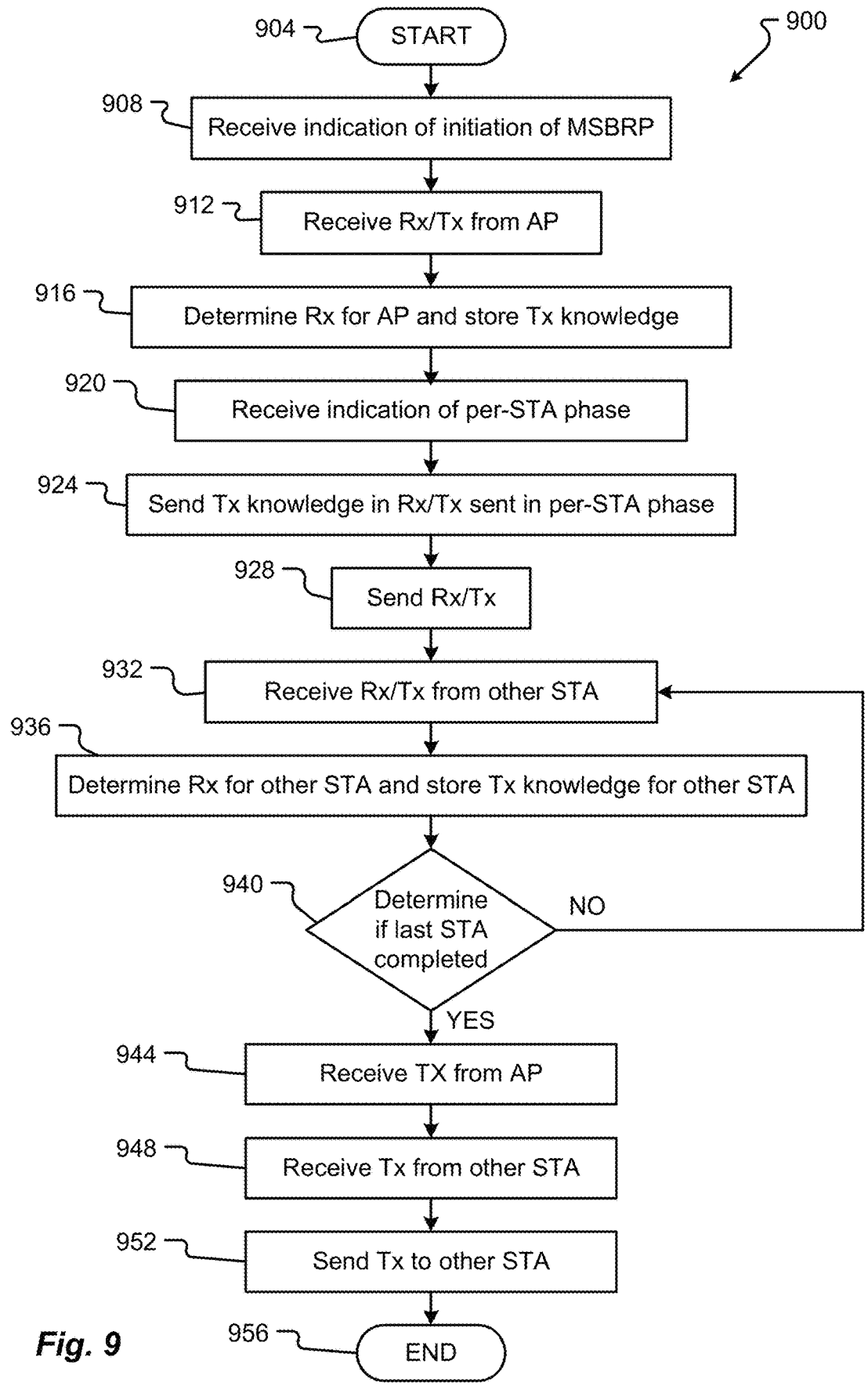
FIG. 9 is a flowchart illustrating another method for conducting a MSBRP.

An embodiment of a method 900 for conducting MSBRP, from the viewpoint of a responder STA 104, is as shown in FIG. 9. Generally, the method 900 starts with a start operation 904 and ends with an end operation 956. The method 900 can include more or fewer steps or can arrange the order of the steps differently than those shown in FIG. 9. The method 900 can be executed as a set of computer-executable instructions, executed by a computer system or processing component, and be encoded or stored on a storage medium. Further, the method 900 can be executed by a gate or other hardware device or component in an ASIC, a FPGA, or other type of hardware device. Hereinafter, the method 900 shall be explained with reference to the systems, components, modules, software, data structures, etc. described herein. The method 900 will be described with association to STA 104a as displayed in FIG. 6. However, it should be noted that the method steps described herein may be altered or reordered if the responder STA were STA 104b or STA 104c, as shown in FIG. 6.

A STA 104 may receive indication of the beginning of a MSBRP, in step 908. The indication for the initiation of MSBRP may be a BRP trigger 208 sent to the STA 104a from an AP 102. The trigger 208 can include timing information or information designating whether the per-STA phase 204 of the BRP will occur after polling the STA 104a. Regardless, the STA 104a can receive this information and wait for the multi-STA phase 202 of the MSBRP. The trigger frame 208 can also include an indication of whether STA-to-STA beamform training will also be conducted during the MSBRP.

After the beginning of the multi-STA phase 202, the STA 104a can receive BRP-Rx 210 and BRP-Tx 212, in step 912. The AP 102 can send the BRP-Rx 210 and BRP-Tx 212 to all STAs 104, which can be received by STA 1 104a.

From the BRP-Rx 210 and BRP-Tx 212, the STA 104a can determine a best Rx sector 238, and, by estimation, a best Tx sector 240 for the AP 102, in step 916. The STA 104a can determine the best Tx vector 240 based on the best Rx sector 238. The STA 104A can also store the Tx knowledge 240, in step 916. The stored Tx knowledge 240 can be stored for later during the per-STA BRP phase 204. The STA 104a may then wait for the per-STA phase 204.

In step 920, the STA 104a can receive an indication that the per-STA phase 204 has begun, and more particularly, that the first portion, associated with STA 1 104a, of the per-STA phase 204 has begun. The per-STA phase 204 may begin at a certain time or follow another poll or trigger frame 304 being sent from the AP 102. The dotted line 230 indicates the beginning of the first portion of the per-STA phase 204 in which STA 1 104a will send training signals.

Thus, upon receiving the signal 304 or upon reaching time 230, STA 1 104a can send BRP-Rx 214 and BRP-Tx 216 for the AP 102 and/or STAs 104b, 104c, in step 928. In some configurations, the AP transmit knowledge 240, determined or gleaned from the multi-STA phase 202, may be sent, by the STA 104a, with the BRP-Rx 214 and BRP-Tx 216, in step 924. Thus, based on the signals sent from the STA 104a, the AP 102 can determine the best receive sector 250 and the best transmit sector 252. The STA transmit knowledge 254 may be gleaned from the receive determination 250 made from the BRP-Rx 214 and BRP-Tx 216 sent from the STA 104a. This STA Tx knowledge 254 may then be stored for later use in the termination phase 206 of the MSBRP. STA 1 104a sends BRP-Rx 214 and BRP-Tx 216, in step 928 and then awaits other signals from either other STAs 104b and 104c or the AP 102, after the end of the first portion of the per-STA phase at time 232.

Optionally, the STA 104a may receive BRP-Rx 218 and BRP-Tx 220 signals from STA 2 104b, in step 932. During the second portion of the per-STA phase 204, which begins at time 232, the STA 2 104b can send BRP-Rx 218 and BRP-Tx 220 to the AP 102. From the BRP-Rx 218 and BRP-Tx 220 signals, STA 1 104a can determine the best receive vector 520. Further, the BRP-Rx 218 and BRP-Tx 220 may also include the STA Tx Knowledge 244 from STA 2 104b that helps STA 1 104a determine the best Tx vector 524 for STA 2 104b. For example, as shown in FIG. 5, STA 2 104b may have already received training information during the first portion of the per-STA phase 202 associated with STA 1 104a. This STA Tx Knowledge 244 is transmit knowledge 524 provided in the second portion of the per-STA phase 202.

Further, based on the BRP-Rx 218 and BRP-Tx 220, STA 1 104a can determine the best Rx vector 520 for STA 2 104b, which becomes STA 2 Tx knowledge 524 for STA 2. Thus, from the BRP-Rx 218 and BRP-Tx 220 received from STA 2 104b, STA 1 104a may determine the best Rx and Tx vectors for STA 2 104b, in step 936. This process of determining Rx and Tx vectors for other stations 104 may continue until all (STAs 104c, etc.) have transmitted their BRP RX and BRP TX. The method 900 may then branch from step 940 either NO back to STA 1 104a receiving more BRP RX and BRP TX signals from another STA 104, for example, STA 3 104c, in step 932 or YES from step 940 to step 944 (if the per-STA phase 204 of the MSBRP has ended).

In the termination phase 206, which starts at time 234, the AP 102 may send its STA transmit knowledge 254 in a MSBRP feedback packet 412 or some other signal back to STA 1 104a, in step 944. STA 1 104a can receive this Tx knowledge 268 and store or record that Tx information 274. At this point, STA 1 104a has completed the MSBRP process. In an alternative configuration, STA 1 104a receives the STA Tx Knowledge 254 in a Poll and Feedback packet 404 sent to begin the second portion of the per-STA phase 204.

In optional configurations, such as that shown in FIG. 6, STA 104a may have a portion of the termination phase 206 to send feedback to the other STAs 104b, 104c. This portion of the termination phase 206 may include STA 1 104a sending a BRP feedback packet 616 to STA 2 104b and STA 3 104c, in step 952. Thus, the information about the best Tx sector 620 for STA 2 104b and the best Tx sector 624 for STA 3 104c can be received and recorded by those STAs 104b, 104c based on the feedback 616 provided by STA 1 104a.

If the responder STA 104 in the above scenario is different from STA 1 104a, such as STA 2 104b, that STA 104 may receive the Tx information from the STA 1 104a, in step 948. Thus, the other STA 104b can receive the BRP feedback packet 616 and record that information as Tx trained information for STA 1 104a.

Figure 10:
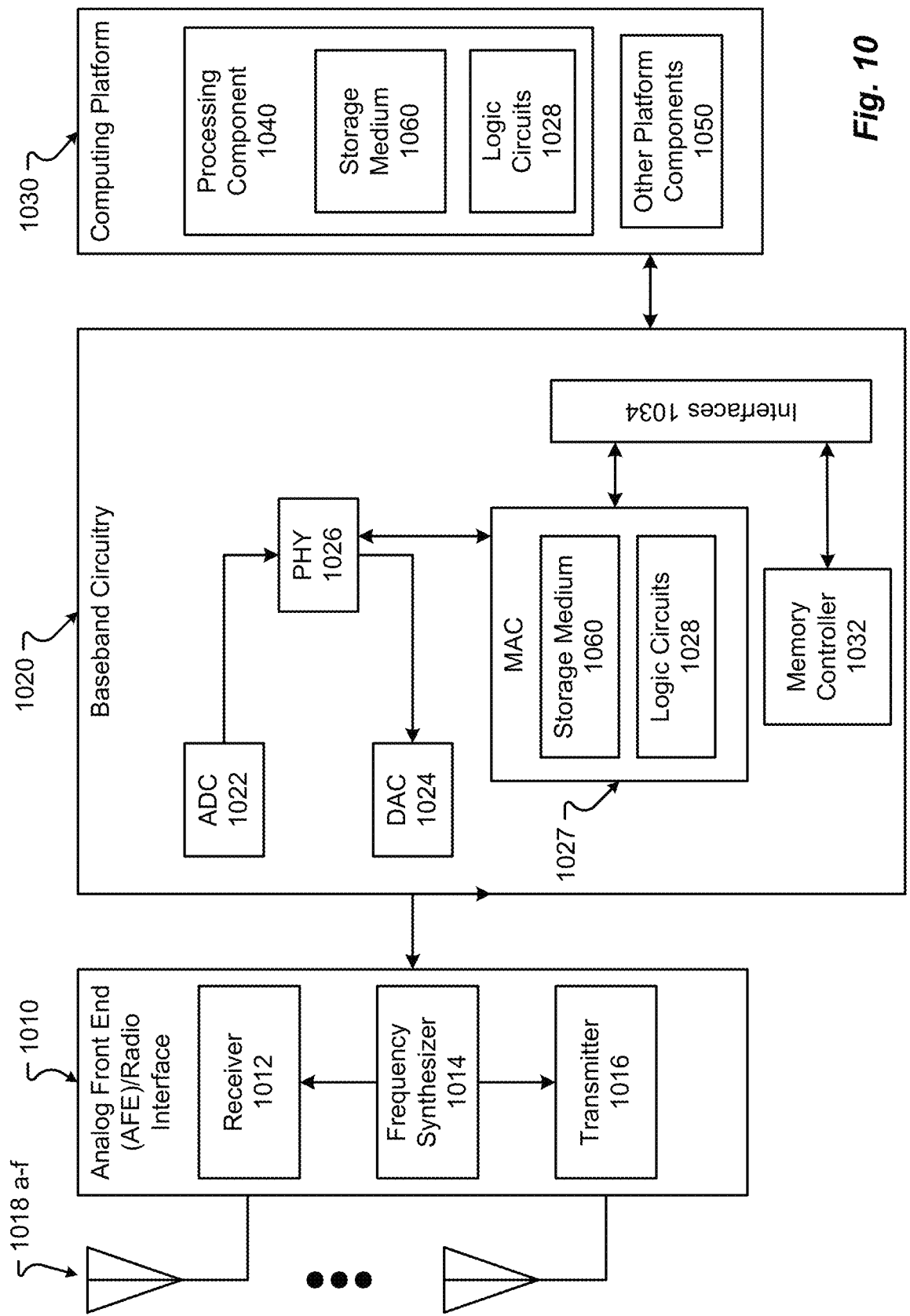
FIG. 10 is a block diagram illustrating an embodiment of a wireless device.

FIG. 10 illustrates an embodiment of a communications device 1000 that may implement one or more of AP 102 and STAs 104a-104d of FIG. 1. In various embodiments, device 1000 may comprise a logic circuit 1028. The logic circuit 1028 may include physical circuits to perform operations described for one or more of AP 102 and STAs 104a-104d of FIG. 1, for example. As shown in FIG. 10, device 1000 may include one or more of, but is not limited to, a radio interface 1010, baseband circuitry 1020, and/or computing platform 1030.

The device 1000 may implement some or all of the structure and/or operations for one or more of AP 102 and STAs 104a-104d of FIG. 1, storage medium 1060, and logic circuit 1028 in a single computing entity, such as entirely within a single device. Alternatively, the device 1000 may distribute portions of the structure and/or operations for one or more of AP 102 and STAs 104a-104d of FIG. 1, storage medium 1060, and logic circuit 1028 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems.

An Analog Front End (AFE) module 1010, which is needed to enable the correct processing of the received modulated signal and signal conditioning for a transmitted signal. The AFE 305 can be functionally located between the antenna and a digital baseband system in order to convert the analog signal into a digital signal for processing and vice-versa. The AFE 1010 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the configurations are not limited to any specific over-the-air interface or modulation scheme. AFE 1010 may include, for example, a receiver 1012, a frequency synthesizer 1014, and/or a transmitter 1016. AFE 1010 may include bias controls, a crystal oscillator, and/or one or more antennas 1018-*f*. In additional or alternative configurations, the AFE 1010 may use external voltage-controlled oscillators (VCOs), surface acoustic wave filters, intermediate frequency (IF) filters and/or RF filters, as desired.

Baseband circuitry 1020 may communicate with AFE 1010 to process, receive, and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1026 for the PHY link layer processing of respective receive/transmit signals. Baseband circuitry 1020 may include, for example, a medium access control (MAC) processing circuit 1027 for MAC/data link layer processing. Baseband circuitry 1020 may include a memory controller 1032 for communicating with MAC processing circuit 1027 and/or a computing platform 1030, for example, via one or more interfaces 1034.

In some configurations, PHY processing circuit 1026 may include a frame construction and/or detection module, in combination with additional circuitry such as a buffer memory, to construct and/or deconstruct communication frames. Alternatively or in addition, MAC processing circuit 1027 may share processing for certain of these functions or perform these processes independent of PHY processing circuit 1026. In some configurations, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for one or more of AP 102 and STAs 104*a*-104, storage medium 1060, and logic circuit 1028 using the processing component 1040. The processing component 1040 (and/or PHY 1026 and/or MAC 1027) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units 1060 may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired.

Embodiments of device 1000 may be implemented using single input single output (SISO) architectures. However, certain implementations may include multiple antennas (e.g., antennas 1018-*f*) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware, and/or software elements may be collectively or individually referred to herein as "logic," "circuit," or "processor."

It should be appreciated that the exemplary device 1000 shown in the block diagram of FIG. 10 may represent one functionally descriptive example of many potential implementations. Accordingly, division, omission, or inclusion of block functions depicted in the accompanying figures does not infer that the hardware components, circuits, software and/or elements for implementing these functions would be necessarily be divided, omitted, or included in embodiments.

The device in FIG. 10 can also contain a security module (not shown). This security module can contain information regarding, but not limited to, security parameters required to connect the device to another device or other available networks or network devices, and can include WEP or WPA security access keys, network keys, etc., as discussed.

Another module that the device in FIG. 10 can include is a network access unit (not shown). The network access unit can be used for connecting with another network device. In one example, connectivity can include synchronization between devices. In another example, the network access unit can work as a medium which provides support for communication with other stations. In yet another example, the network access unit can work in conjunction with at least the MAC circuitry 1027. The network access unit can also work and interact with one or more of the modules/components described herein.

Exemplary aspects are directed toward:
A wireless device comprising:
a plurality of antennas; and
a baseband circuitry in communication with the plurality of antennas, the baseband circuitry configured to:
generate a trigger frame to initiate a multiple station beam refinement protocol (MSBRP) with two or more stations (STAs), wherein the two or more stations comprises at least a first station and a second station;
transmit to the first station and the second station a first sector sweep (SSW) frame for each of a plurality of sectors, wherein each of the plurality of sectors correspond to a weight vector for the plurality of antennas;
in a per-station phase:
receive from the first station a second SSW frame for a second plurality of sectors;
select a first sector to use for the first station based on a first quality of reception of the second SSW frame for each of the second plurality of sectors;
at a later time, receive from the second station a third SSW frame for a third plurality of sectors;
select a second sector to use for the second station based on a second quality of reception of the third SSW frame for each of the third plurality of sectors; and
transmit feedback to the two or more stations to indicate the first and second sector that the first station and second station are to use to transmit to the wireless device.

Any one or more of the above aspects, wherein the second SSW frame comprises an indication of a selection by the first station of a third sector for the wireless device to use to transmit to the first station.

Any one or more of the above aspects, wherein the trigger frame comprises identifiers of the first and second stations and an order for the per-STA phase.

Any one or more of the above aspects, wherein the order is based on an order of the identifiers in the trigger frame.

Any one or more of the above aspects, wherein the first SSW frame comprises two or more training fields.

Any one or more of the above aspects, wherein a number of the one or more training fields is equal to a number of the two or more stations antennas times a number of sectors to be received by each of the two or more stations.

Any one or more of the above aspects, wherein the trigger frame comprises one or more of the following fields: an association identifier for each of the two or more stations, a group identifier that identifies two or more of the two or more stations, an order for the per-STA phase, and an indication of how the order of the one or more stations is initiated.

Any one or more of the above aspects, wherein the trigger frame comprises a set of information that is common to each of the two or more stations, wherein the set of common information comprises one or more of the following fields: a number of sectors in the first plurality of sectors, a number of sectors in the second and/or third plurality of sectors, a number of transmit sectors for the two or more stations, a number of receive sectors for the wireless device, and an indication of how the first and/or second sector is be transmitted.

Any one or more of the above aspects, wherein the first or second sector to use is communicated as a best sector, a channel estimation, or a received signal strength indication (RSSI) for two or more sectors.

Any one or more of the above aspects, wherein the baseband circuitry is configured to transmit a poll packet to the first station to initiate a portion of the per-STA phase associated with the first station.

Any one or more of the above aspects, wherein the baseband circuitry is configured to transmit the first SSW frame in accordance with a beam refinement protocol (BRP).

Any one or more of the above aspects, further comprising one or more of an analog front end, a security module, storage, one or more antennas, MAC circuitry, and a network access unit.

A non-transitory computer-readable storage media that stores instructions for execution by one or more processors to perform operations to execute a multiple station beam refinement protocol on a wireless device, the instructions comprising:
instructions to generate a trigger frame to initiate a multiple station beam refinement protocol (MSBRP) with two or more stations (STAs), wherein the two or more stations comprises at least a first station and a second station, wherein the MSBRP includes at least a multiple station phase and a per-STA phase, wherein the per-STA phase is separated into at least a first portion, associated with the first station, and a second portion, associated with the second station;
in the multiple station phase, instructions to transmit to the first station and the second station a first sector sweep (SSW) frame for each of a plurality of sectors, wherein each of the plurality of sectors correspond to a weight vector for the plurality of antennas;
in the per-STA phase:
instructions to receive from the first station a second SSW frame for a second plurality of sectors;
instructions to select a first sector to use for the first station based on a first quality of reception of the second SSW frame for each of the second plurality of sectors;
at a later time, instructions to receive from the second station a third SSW frame for a third plurality of sectors;
instructions to select a second sector to use for the second station based on a second quality of reception of the third SSW frame for each of the third plurality of sectors; and instructions to transmit feedback to the two or more stations to indicate the first and second sector that the first station and second station are to use to transmit to the wireless device.

Any one or more of the above aspects, wherein the second SSW frame comprises an indication of a selection by the first station of a third sector for the wireless device to use to transmit to the first station.

Any one or more of the above aspects, wherein the trigger frame comprises one or more of the following fields: an association identifier for each of the two or more stations, a group identifier that identifies two or more of the two or more stations, an order for the per-STA phase, and an indication of how the order of the one or more stations is initiated.

Any one or more of the above aspects, wherein the trigger frame comprises a set of information that is common to each of the two or more stations, wherein the set of common information comprises one or more of the following fields: a number of sectors in the first plurality of sectors, a number of sectors in the second and/or third plurality of sectors, a number of transmit sectors for the two or more stations, a number of receive sectors for the wireless device, and an indication of how the first and/or second sector is be transmitted.

Any one or more of the above aspects, wherein the trigger frame comprises identifiers of the first and second stations and an order for the per-STA phase.

Any one or more of the above aspects, wherein the order is based on an order of the identifiers in the trigger frame.

Any one or more of the above aspects, wherein the first SSW frame comprises two or more training fields.

Any one or more of the above aspects, wherein a number of the one or more training fields is equal to a number of the two or more stations antennas times a number of sectors to be received by each of the two or more stations.

Any one or more of the above aspects, wherein the first or second sector to use is communicated as a best sector, a channel estimation, or a received signal strength indication (RSSI) for two or more sectors.

Any one or more of the above aspects, further comprising instructions to transmit a poll packet to the first station to initiate a portion of the per-STA phase associated with the first station.

Any one or more of the above aspects, further comprising instructions to transmit the first SSW frame in accordance with a beam refinement protocol (BRP).

A method for performing operations to execute a multiple station beam refinement protocol on a wireless device, the method comprising: generating a trigger frame to initiate a multiple station beam refinement protocol (MSBRP) with two or more stations (STAs), wherein the two or more stations comprises at least a first station and a second station, wherein the MSBRP includes at least a multiple station phase and a per-STA phase, wherein the per-STA phase is separated into at least a first portion, associated with the first station, and a second portion, associated with the second station;

in the multiple station phase, transmitting to the first station and the second station a first sector sweep (SSW) frame for each of a plurality of sectors, wherein each of the plurality of sectors correspond to a weight vector for the plurality of antennas;

in the per-STA phase:
receiving from the first station a second SSW frame for a second plurality of sectors;

selecting a first sector to use for the first station based on a first quality of reception of the second SSW frame for each of the second plurality of sectors;

at a later time, receiving from the second station a third SSW frame for a third plurality of sectors;

selecting a second sector to use for the second station based on a second quality of reception of the third SSW frame for each of the third plurality of sectors; and transmitting feedback to the two or more stations to indicate the first and second sector that the first station and second station are to use to transmit to the wireless device.

Any one or more of the above aspects, wherein the second SSW frame comprises an indication of a selection by the first station of a third sector for the wireless device to use to transmit to the first station.

Any one or more of the above aspects, wherein the trigger frame comprises one or more of the following fields: an association identifier for each of the two or more stations, a group identifier that identifies two or more of the two or more stations, an order for the per-STA phase, and an indication of how the order of the one or more stations is initiated.

Any one or more of the above aspects, wherein the trigger frame comprises a set of information that is common to each of the two or more stations, wherein the set of common information comprises one or more of the following fields: a number of sectors in the first plurality of sectors, a number of sectors in the second and/or third plurality of sectors, a number of transmit sectors for the two or more stations, a number of receive sectors for the wireless device, and an indication of how the first and/or second sector is be transmitted.

Any one or more of the above aspects, wherein the trigger frame comprises identifiers of the first and second stations and an order for the per-STA phase.

Any one or more of the above aspects, wherein the order is based on an order of the identifiers in the trigger frame.

Any one or more of the above aspects, wherein the first SSW frame comprises two or more training fields.

Any one or more of the above aspects, wherein a number of the one or more training fields is equal to a number of the two or more stations antennas times a number of sectors to be received by each of the two or more stations.

Any one or more of the above aspects, wherein the first or second sector to use is communicated as a best sector, a channel estimation, or a received signal strength indication (RSSI) for two or more sectors.

Any one or more of the above aspects, further comprising transmitting a poll packet to the first station to initiate a portion of the per-STA phase associated with the first station.

Any one or more of the above aspects, further comprising transmitting the first SSW frame in accordance with a beam refinement protocol (BRP).

A wireless device for performing operations to execute a multiple station beam refinement protocol on a wireless device, the wireless device comprising:

means for generating a trigger frame to initiate a multiple station beam refinement protocol (MSBRP) with two or more stations (STAs), wherein the two or more stations comprises at least a first station and a second station, wherein the MSBRP includes at least a multiple station phase and a per-STA phase, wherein the per-STA phase is separated into at least a first portion, associated with the first station, and a second portion, associated with the second station;

in the multiple station phase, means for transmitting to the first station and the second station a first sector sweep (SSW)

frame for each of a plurality of sectors, wherein each of the plurality of sectors correspond to a weight vector for the plurality of antennas;
  in the per-STA phase:
  means for receiving from the first station a second SSW frame for a second plurality of sectors;
  means for selecting a first sector to use for the first station based on a first quality of reception of the second SSW frame for each of the second plurality of sectors;
  at a later time, means for receiving from the second station a third SSW frame for a third plurality of sectors;
  means for selecting a second sector to use for the second station based on a second quality of reception of the third SSW frame for each of the third plurality of sectors; and
  means for transmitting feedback to the two or more stations to indicate the first and second sector that the first station and second station are to use to transmit to the wireless device.

Any one or more of the above aspects, wherein the second SSW frame comprises an indication of a selection by the first station of a third sector for the wireless device to use to transmit to the first station.

Any one or more of the above aspects, wherein the trigger frame comprises one or more of the following fields: an association identifier for each of the two or more stations, a group identifier that identifies two or more of the two or more stations, an order for the per-STA phase, and an indication of how the order of the one or more stations is initiated.

Any one or more of the above aspects, wherein the trigger frame comprises a set of information that is common to each of the two or more stations, wherein the set of common information comprises one or more of the following fields: a number of sectors in the first plurality of sectors, a number of sectors in the second and/or third plurality of sectors, a number of transmit sectors for the two or more stations, a number of receive sectors for the wireless device, and an indication of how the first and/or second sector is be transmitted.

Any one or more of the above aspects, wherein the trigger frame comprises identifiers of the first and second stations and an order for the per-STA phase.

Any one or more of the above aspects, wherein the order is based on an order of the identifiers in the trigger frame.

Any one or more of the above aspects, wherein the first SSW frame comprises two or more training fields.

Any one or more of the above aspects, wherein a number of the one or more training fields is equal to a number of the two or more stations antennas times a number of sectors to be received by each of the two or more stations.

Any one or more of the above aspects, wherein the first or second sector to use is communicated as a best sector, a channel estimation, or a received signal strength indication (RSSI) for two or more sectors.

Any one or more of the above aspects, further comprising means for transmitting a poll packet to the first station to initiate a portion of the per-STA phase associated with the first station.

Any one or more of the above aspects, further comprising means for transmitting the first SSW frame in accordance with a beam refinement protocol (BRP).

Any one or more of the above aspects, further comprising means for one or more of an analog front end, a security module, storage, one or more antennas, MAC circuitry, and a network access unit.

A method comprising:
  a responder station receiving a trigger frame to conduct a multiple station beam refinement protocol (MSBRP) with an access point and one or more other stations (STAs), wherein the MSBRP includes at least a multiple station phase and a per-STA phase, wherein the per-STA phase is separated into at least a first portion and a second portion, wherein the first portion is associated with the responder station and the second portion is associated with one of the one or more other stations;
  during the multiple station phase, the responder station:
    receiving, from the access point, a first sector sweep (SSW) frame for each of a first plurality of sectors;
    selecting a receive sector to use of the first plurality of sectors based on a quality of reception of the first SSW frame;
    based on the receive sector, determining a transmit sector that the access point should use to send data to the responder station;
  during the first portion of the per-STA phase, the responder station:
    transmitting a second SSW frame for each of a second plurality of sectors, wherein the second SSW frame indicates, to the access point, the transmit sector to use to send data to the responder station; and
    at a later time, receiving, from the access point, a transmit vector to use to send data to the access point.

Any one or more of the above aspects, further comprising the responder station receiving a poll to begin the first portion of the per-STA phase.

Any one or more of the above aspects, further comprising:
  during a second portion of the per-STA phase, the responder station:
    receiving, from a second station, a third SSW frame for each of a third plurality of sectors;
    selecting a second receive sector to use of the third plurality of sectors based on a second quality of reception of the third SSW frame;
    based on the second receive sector, determining a third transmit sector that the second station should use to send data to the responder station; and
    at a later time, sending, to the second station, the third transmit vector for the second station to use to send data to the responder station.

Any one or more of the above aspects, further comprising, in the third SSW frame, receiving a second transmit sector to use to send data to the second station, wherein the second station determined the second transmit sector based on the second SSW frame sent by the responder station.

Any one or more of the above aspects, wherein the trigger frame comprises identifiers of the responder station and of the one or more other stations and an order for the per-STA phase.

Any one or more of the above aspects, wherein the order is based on an order of the identifiers in the trigger frame.

Any one or more of the above aspects, wherein the first SSW frame comprises two or more training fields.

Any one or more of the above aspects, wherein a number of the one or more training fields is equal to a number of the two or more stations antennas times a number of sectors to be received by each of the responder stations and the one or more other stations.

Any one or more of the above aspects, wherein the trigger frame comprises one or more of the following fields: an association identifier for each of the responder station and the one or more other stations, a group identifier that identifies two or more of the responder station and the one or more other stations, an order for the per-STA phase, and an indication of how the order of the one or more stations is initiated.

Any one or more of the above aspects, wherein the trigger frame comprises a set of information that is common to each of the responder station and the one or more other stations, wherein the set of common information comprises one or more of the following fields: a number of sectors in the first plurality of sectors, a number of sectors in the second plurality of sectors, a number of transmit sectors for the responder station and the one or more other stations, a number of receive sectors for the method, and an indication of how the first and/or second sector is be transmitted.

Any one or more of the above aspects, wherein the transmit sector to use is communicated as a best sector, a channel estimation, or a received signal strength indication (RSSI) for two or more sectors.

Any one or more of the above aspects, further comprising the responder station receiving the first SSW frame in accordance with a beam refinement protocol (BRP).

A wireless device comprising:
a plurality of antennas; and
a baseband circuitry in communication with the plurality of antennas, the baseband circuitry configured to:
  receive a trigger frame to conduct a multiple station beam refinement protocol (MSBRP) with an access point and one or more other stations (STAs), wherein the MSBRP includes at least a multiple station phase and a per-STA phase, wherein the per-STA phase is separated into at least a first portion and a second portion, wherein the first portion is associated with the responder station and the second portion is associated with one of the one or more other stations;
  during the multiple station phase:
    receive, from the access point, a first sector sweep (SSW) frame for each of a first plurality of sectors;
    select a receive sector to use of the first plurality of sectors based on a quality of reception of the first SSW frame;
    based on the receive sector, determine a transmit sector that the access point should use to send data to the responder station;
  during the first portion of the per-STA phase:
    transmit a second SSW frame for each of a second plurality of sectors, wherein the second SSW frame indicates, to the access point, the transmit sector to use to send data to the responder station; and
    at a later time, receive, from the access point, a transmit vector to use to send data to the access point.

Any one or more of the above aspects, wherein the baseband circuitry is further configured to receive a poll to begin the first portion of the per-STA phase.

Any one or more of the above aspects, wherein the baseband circuitry is further configured to:
  during a second portion of the per-STA phase:
  receive, from a second station, a third SSW frame for each of a third plurality of sectors;
  select a second receive sector to use of the third plurality of sectors based on a second quality of reception of the third SSW frame;
  based on the second receive sector, determine a third transmit sector that the second station should use to send data to the responder station; and
  at a later time, send, to the second station, the third transmit vector for the second station to use to send data to the responder station.

Any one or more of the above aspects, wherein the baseband circuitry is further configured to: in the third SSW frame, receive a second transmit sector to use to send data to the second station, wherein the second station determined the second transmit sector based on the second SSW frame sent by the responder station.

Any one or more of the above aspects, wherein the trigger frame comprises identifiers of the responder station and of the one or more other stations and an order for the per-STA phase.

Any one or more of the above aspects, wherein the order is based on an order of the identifiers in the trigger frame.

Any one or more of the above aspects, wherein the first SSW frame comprises two or more training fields.

Any one or more of the above aspects, wherein a number of the one or more training fields is equal to a number of the two or more stations antennas times a number of sectors to be received by each of the responder stations and the one or more other stations.

Any one or more of the above aspects, wherein the trigger frame comprises one or more of the following fields: an association identifier for each of the responder station and the one or more other stations, a group identifier that identifies two or more of the responder station and the one or more other stations, an order for the per-STA phase, and an indication of how the order of the one or more stations is initiated.

Any one or more of the above aspects, wherein the trigger frame comprises a set of information that is common to each of the responder station and the one or more other stations, wherein the set of common information comprises one or more of the following fields: a number of sectors in the first plurality of sectors, a number of sectors in the second plurality of sectors, a number of transmit sectors for the responder station and the one or more other stations, a number of receive sectors for the wireless device, and an indication of how the first and/or second sector is be transmitted.

Any one or more of the above aspects, wherein the transmit sector to use is communicated as a best sector, a channel estimation, or a received signal strength indication (RSSI) for two or more sectors.

Any one or more of the above aspects, wherein the responder station is configured to receive the first SSW frame in accordance with a beam refinement protocol (BRP).

Any one or more of the above aspects, further comprising one or more of an analog front end, a security module, storage, one or more antennas, MAC circuitry, and a network access unit.

A wireless device comprising:
  means for receiving a trigger frame to conduct a multiple station beam refinement protocol (MSBRP) with an access point and one or more other stations (STAs), wherein the MSBRP includes at least a multiple station phase and a per-STA phase, wherein the per-STA phase is separated into at least a first portion and a second portion, wherein the first portion is associated with the responder station and the second portion is associated with one of the one or more other stations;
    during the multiple station phase:
    means for receiving, from the access point, a first sector sweep (SSW) frame for each of a first plurality of sectors;
    means for selecting a receive sector to use of the first plurality of sectors based on a quality of reception of the first SSW frame;

based on the receive sector, means for determining a transmit sector that the access point should use to send data to the responder station;

during the first portion of the per-STA phase:

means for transmitting a second SSW frame for each of a second plurality of sectors, wherein the second SSW frame indicates, to the access point, the transmit sector to use to send data to the responder station; and at a later time, means for receiving, from the access point, a transmit vector to use to send data to the access point.

Any one or more of the above aspects, further comprising means for receiving a poll to begin the first portion of the per-STA phase.

Any one or more of the above aspects, further comprising:

during a second portion of the per-STA phase:

means for receiving, from a second station, a third SSW frame for each of a third plurality of sectors;

means for selecting a second receive sector to use of the third plurality of sectors based on a second quality of reception of the third SSW frame;

based on the second receive sector, means for determining a third transmit sector that the second station should use to send data to the responder station; and at a later time, means for sending, to the second station, the third transmit vector for the second station to use to send data to the responder station.

Any one or more of the above aspects, further comprising, in the third SSW frame, means for receiving a second transmit sector to use to send data to the second station, wherein the second station determined the second transmit sector based on the second SSW frame sent by the responder station.

Any one or more of the above aspects, wherein the trigger frame comprises identifiers of the responder station and of the one or more other stations and an order for the per-STA phase.

Any one or more of the above aspects, wherein the order is based on an order of the identifiers in the trigger frame.

Any one or more of the above aspects, wherein the first SSW frame comprises two or more training fields.

Any one or more of the above aspects, wherein a number of the one or more training fields is equal to a number of the two or more stations antennas times a number of sectors to be received by each of the responder stations and the one or more other stations.

Any one or more of the above aspects, wherein the trigger frame comprises one or more of the following fields: an association identifier for each of the responder station and the one or more other stations, a group identifier that identifies two or more of the responder station and the one or more other stations, an order for the per-STA phase, and an indication of how the order of the one or more stations is initiated.

Any one or more of the above aspects, wherein the trigger frame comprises a set of information that is common to each of the responder station and the one or more other stations, wherein the set of common information comprises one or more of the following fields: a number of sectors in the first plurality of sectors, a number of sectors in the second plurality of sectors, a number of transmit sectors for the responder station and the one or more other stations, a number of receive sectors for the wireless device, and an indication of how the first and/or second sector is be transmitted.

Any one or more of the above aspects, wherein the transmit sector to use is communicated as a best sector, a channel estimation, or a received signal strength indication (RSSI) for two or more sectors.

Any one or more of the above aspects, further comprising means for receiving the first SSW frame in accordance with a beam refinement protocol (BRP).

Any one or more of the above aspects, further comprising means for one or more of an analog front end, a security module, storage, one or more antennas, MAC circuitry, and a network access unit.

A non-transitory computer-readable storage media that stores instructions for execution by one or more processors to perform operations to execute a multiple station beam refinement protocol on a wireless device, the instructions comprising:

instructions to receiving a trigger frame to conduct a multiple station beam refinement protocol (MSBRP) with an access point and one or more other stations (STAs), wherein the MSBRP includes at least a multiple station phase and a per-STA phase, wherein the per-STA phase is separated into at least a first portion and a second portion, wherein the first portion is associated with the responder station and the second portion is associated with one of the one or more other stations;

during the multiple station phase:

instructions to receive, from the access point, a first sector sweep (SSW) frame for each of a first plurality of sectors;

instructions to select a receive sector to use of the first plurality of sectors based on a quality of reception of the first SSW frame;

based on the receive sector, instructions to determine a transmit sector that the access point should use to send data to the responder station;

during the first portion of the per-STA phase:

instructions to transmit a second SSW frame for each of a second plurality of sectors, wherein the second SSW frame indicates, to the access point, the transmit sector to use to send data to the responder station; and at a later time, instructions to receive, from the access point, a transmit vector to use to send data to the access point.

Any one or more of the above aspects, further comprising instructions to receive a poll to begin the first portion of the per-STA phase.

Any one or more of the above aspects, further comprising:

during a second portion of the per-STA phase:

instructions to receive, from a second station, a third SSW frame for each of a third plurality of sectors;

instructions to select a second receive sector to use of the third plurality of sectors based on a second quality of reception of the third SSW frame;

based on the second receive sector, instructions to determine a third transmit sector that the second station should use to send data to the responder station; and at a later time, instructions to send, to the second station, the third transmit vector for the second station to use to send data to the responder station.

Any one or more of the above aspects, further comprising, in the third SSW frame, instructions to receive a second transmit sector to use to send data to the second station, wherein the second station determined the second transmit sector based on the second SSW frame sent by the responder station.

Any one or more of the above aspects, wherein the trigger frame comprises identifiers of the responder station and of the one or more other stations and an order for the per-STA phase.

Any one or more of the above aspects, wherein the order is based on an order of the identifiers in the trigger frame.

Any one or more of the above aspects, wherein the first SSW frame comprises two or more training fields.

Any one or more of the above aspects, wherein a number of the one or more training fields is equal to a number of the two or more stations antennas times a number of sectors to be received by each of the responder stations and the one or more other stations.

Any one or more of the above aspects, wherein the trigger frame comprises one or more of the following fields: an association identifier for each of the responder station and the one or more other stations, a group identifier that identifies two or more of the responder station and the one or more other stations, an order for the per-STA phase, and an indication of how the order of the one or more stations is initiated.

Any one or more of the above aspects, wherein the trigger frame comprises a set of information that is common to each of the responder station and the one or more other stations, wherein the set of common information comprises one or more of the following fields: a number of sectors in the first plurality of sectors, a number of sectors in the second plurality of sectors, a number of transmit sectors for the responder station and the one or more other stations, a number of receive sectors for the media, and an indication of how the first and/or second sector is be transmitted.

Any one or more of the above aspects, wherein the transmit sector to use is communicated as a best sector, a channel estimation, or a received signal strength indication (RSSI) for two or more sectors.

Any one or more of the above aspects, further comprising instructions to receive the first SSW frame in accordance with a beam refinement protocol (BRP).

Any one or more of the aspects as substantially described herein.

For purposes of explanation, numerous details are set forth in order to provide a thorough understanding of the present embodiments. It should be appreciated however that the techniques herein may be practiced in a variety of ways beyond the specific details set forth herein.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, WiFi, LTE, 4G, Bluetooth®, WirelessHD, WiGig, WiGi, 3GPP, Wireless LAN, WiMAX, and the like.

The term transceiver as used herein can refer to any device that comprises hardware, software, circuitry, firmware, or any combination thereof and is capable of performing any of the methods, techniques and/or algorithms described herein.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Corte™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Provided herein are exemplary systems and methods for full- or half-duplex communications in a wireless device(s). While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A wireless device comprising:
a physical layer (PHY);
a media access control (MAC); and
circuitry capable of communication with a plurality of antennas, at least one of the PHY, MAC or the circuitry configured to:
generate a trigger frame to initiate a multiple station beam refinement protocol (MSBRP) with two or more stations (STAs), that have associated with the wireless device, wherein the two or more stations comprise at least a first station and a second station, the two or more stations that will participate in the MSBRP identified with an identifier (ID);
generate for transmission to the first station and the second station a first sector sweep (SSW) frame including parameters corresponding to each sector of a first plurality of sectors, wherein each of the first plurality of sectors corresponds to a weight vector for the plurality of antennas;
in a per-station phase:
receive from the first station a second SSW frame including parameters identifying a second plurality of sectors;
select a first sector to use for the first station based on a first measurement, the first measurement based on the second SSW frame;
receive from the second station a third SSW frame including parameters identifying a third plurality of sectors;
select a second sector to use for the second station based on a second measurement, the second measurement based on the third SSW frame; and
generate for transmission to the two or more stations feedback to indicate the first sector and the second sector that the first station and second station are to use respectively to transmit to the wireless device.

2. The wireless device of claim 1, wherein each of the second plurality of sectors correspond to the plurality of antennas.

3. The wireless device of claim 1, wherein the trigger frame comprises identifiers of the first and second stations.

4. The wireless device of claim 1, wherein the trigger frame includes an order of identifiers.

5. The wireless device of claim 1, wherein the first SSW frame comprises two or more training fields.

6. The wireless device of claim 5, wherein the wireless device receives from each station training signals in a set of ordered phases.

7. The wireless device of claim 1, wherein the trigger frame comprises one or more of the following fields: an association identifier for each of the two or more stations, a group identifier that identifies two or more of the two or more stations, and an order for the per-STA phase.

8. The wireless device of claim 7, wherein the trigger frame comprises a set of information that is common to each of the two or more stations, wherein the set of common information comprises one or more of the following fields: a number of sectors in the first plurality of sectors, a number of sectors in the second and/or third plurality of sectors, a number of transmit sectors for the two or more stations, and a number of receive sectors for the wireless device.

9. The wireless device of claim 1, wherein the first or second sector to use is communicated as a best sector.

10. The wireless device of claim 1, wherein the circuitry is configured to transmit a poll packet to the first station to initiate a portion of the per-STA phase associated with the first station.

11. The wireless device of claim 1, wherein the circuitry is configured to transmit the first SSW frame in accordance with a beam refinement protocol (BRP).

12. The wireless device of claim 1, wherein the trigger frame comprises an order of identifiers for the stations in the per-STA phase.

13. The wireless device of claim 1, wherein the circuitry is baseband circuitry connectable to the one or more antennas.

14. The wireless device of claim 1, wherein the circuitry is capable of communication with an analog front end that includes a transmitter and a receiver.

15. The wireless device of claim 1, wherein the circuitry further comprises memory that stores a plurality of instructions.

16. The wireless device of claim 1, wherein the circuitry is capable of communication with a processor.

17. The wireless device of claim 1, wherein the circuitry is capable of communication with one or more of an analog to digital converter and/or a digital to analog converter.

18. The wireless device of claim 1, wherein the trigger frame is a High-Efficiency Wireless master-sync transmission.

19. The wireless device of claim 1, wherein the circuitry further comprises a memory controller that communicates with the MAC and/or a computing platform.

20. The wireless device of claim 1, wherein the PHY includes a frame construction and/or detection module, and a memory that constructs and/or deconstructs communication frames.

* * * * *